(12) United States Patent　　(10) Patent No.: US 8,005,603 B2
Fisher et al.　　(45) Date of Patent: Aug. 23, 2011

(54) FUEL CONTROL SYSTEM AND METHOD FOR GAS ENGINES

(75) Inventors: C. Ross Fisher, Cardiff, CA (US); Kristian W. Yates, Escondido, CA (US); David G. Fisher, Carlsbad, CA (US); George A. Mansfield, San Diego, CA (US)

(73) Assignee: Continental Controls Corporation, San Diego, CA (US)

( * ) Notice: Subject to any disclaimer, the term of this patent is extended or adjusted under 35 U.S.C. 154(b) by 568 days.

(21) Appl. No.: 12/236,264

(22) Filed: Sep. 23, 2008

(65) Prior Publication Data

US 2009/0088950 A1    Apr. 2, 2009

Related U.S. Application Data

(60) Provisional application No. 60/975,742, filed on Sep. 27, 2007.

(51) Int. Cl.
　　*F02B 43/00*　　(2006.01)
(52) U.S. Cl. ..................... 701/103; 123/527
(58) Field of Classification Search .......... 123/73 AD, 123/525, 527, 337; 701/103–105
　　See application file for complete search history.

(56) References Cited

U.S. PATENT DOCUMENTS

| | | | |
|---|---|---|---|
| 1,631,716 A | 6/1927 | Baverey | |
| 2,039,353 A | 5/1936 | Seidel | |
| 2,857,145 A | 10/1958 | Morris | |
| 2,939,775 A | 6/1960 | Middleton et al. | |
| 3,123,451 A | 3/1964 | Baverstock | |
| 3,545,948 A | 12/1970 | Baverstock | |
| 3,843,338 A | 10/1974 | Zonker et al. | |
| 4,073,832 A | 2/1978 | McGann | |
| 4,263,883 A | 4/1981 | Treible et al. | |
| 4,308,843 A | 1/1982 | Garretson | |
| 4,335,697 A | 6/1982 | McLean | |
| 4,375,438 A | 3/1983 | McKay | |
| 4,387,685 A | 6/1983 | Abbey | |

(Continued)

FOREIGN PATENT DOCUMENTS

JP    05-030438    4/1993

(Continued)

OTHER PUBLICATIONS

International Search Report and Written Opinion from PCT/US2008/077735 dated Mar. 26, 2009.

(Continued)

*Primary Examiner* — Hai Huynh
(74) *Attorney, Agent, or Firm* — Procopio, Cory, Hargreaves & Savitch LLP

(57) ABSTRACT

A gaseous carburetor or fuel control system includes a fuel metering assembly, a venturi mixer assembly, a throttle assembly, and an electronic control unit. The control unit controls the fuel metering assembly in a closed loop manner based on detected gas and air pressure to an air/fuel mixing venturi. An electronic governor which controls the throttle valve may also be controlled by the same control unit which controls the fuel metering assembly, using a separate control loop.

56 Claims, 18 Drawing Sheets

U.S. PATENT DOCUMENTS

| | | | |
|---|---|---|---|
| 4,387,689 | A | 6/1983 | Brown |
| 4,425,140 | A | 1/1984 | Lassanske et al. |
| 4,425,898 | A | 1/1984 | McLean |
| 4,479,466 | A | 10/1984 | Greenway et al. |
| 4,894,067 | A | 1/1990 | Bayerstock |
| 4,966,735 | A | 10/1990 | LoRusso |
| 4,997,458 | A | 3/1991 | Jones |
| 5,070,851 | A | 12/1991 | Janisch |
| 5,105,790 | A | 4/1992 | Nye, Jr. |
| 5,311,849 | A | 5/1994 | Lambert et al. |
| 5,357,938 | A | 10/1994 | Bedford et al. |
| 5,390,651 | A | 2/1995 | Nussbaum et al. |
| 5,692,478 | A | 12/1997 | Nogi et al. |
| 5,714,683 | A | 2/1998 | Maloney |
| 5,807,512 | A | 9/1998 | Grant |
| 5,863,470 | A | 1/1999 | Grant |
| 5,916,831 | A | 6/1999 | Jager et al. |
| 6,003,543 | A | 12/1999 | Sulatisky et al. |
| 6,026,787 | A | 2/2000 | Sun et al. |
| 6,120,007 | A | 9/2000 | Grant |
| 6,250,260 | B1 | 6/2001 | Green |
| 6,253,751 | B1 | 7/2001 | Carlsson |
| 6,354,268 | B1 | 3/2002 | Beck et al. |
| 6,371,092 | B1 | 4/2002 | Guglielmo et al. |
| 6,543,395 | B2 | 4/2003 | Green |
| 6,666,185 | B1 | 12/2003 | Willi et al. |
| 6,752,135 | B2 | 6/2004 | McLaughlin et al. |
| 6,978,774 | B2 | 12/2005 | Fisher et al. |
| 7,097,162 | B2 | 8/2006 | Ichihara et al. |
| 7,203,593 | B2 | 4/2007 | Lepley et al. |
| 7,410,152 | B2 | 8/2008 | Yates |
| 2009/0117505 | A1 * | 5/2009 | Okayasu ............... 432/221 |

FOREIGN PATENT DOCUMENTS

| | | |
|---|---|---|
| JP | 2000-512711 | 9/2000 |
| JP | 2007-224930 | 9/2007 |
| KR | 83-000214 | 2/1983 |

OTHER PUBLICATIONS

Mixing Venturi VM-350 (also know as FMV6), Continental Controls Corporation, published 2003.
Gas and Air Mixers, Heinzmann GmbH, date unknown.
Gas Mixer D100, Woodward Automotive Products, date unknown.
GECO Stoichiometric Air/Fuel Ratio Control System, Product Specification 035530, Woodward, Mar. 10, 1997.
L-Series Air/Fuel Ratio Control, Product Specification 03255B, Woodward, copyright 2001.
LCS Air/Fuel Ratio Control Aftermarket Kit, Product Specification 03257A, Woodward, copyright 2001.
Lc-50 Integrated gas mixer, throttle body, and programmable speed control/actuator, Product Specification 03222 (Rev. A), Woodward, copyright 2000.
The MEC 2001, Revision 1, Manufactured by Woodward, Miratech Corporation, copyright 1997.
Dynalco Controls, AF-1400 Series, Air Quality Controllers for Carbureted Engines, www.dynalco.com, copyright 1997.
Megajector, http://www.econtrols.com/pages/products/megajector,htm, printed Sep. 12, 2006.
Fisher, Ross. Fuel Control for Gas Engines, hftp://www.continentalcontrols.com/article.cfm?id=19&page=4, composed Mar. 8, 2004, modified Mar. 8, 2004, printed Apr. 14, 2008.
Gas Fuel Control Valve for Use With PLC Controls on Gas Engines Product Brochure, Model AGV5, Continental Controls Corporation, Sep. 28, 1999.
Altronic Air/Fuel Ratio Control for Carbureted Engines EPC-100 Series Product Brochure, Altronic Inc., copyright 1995.
Altronic Air/Fuel Ratio Control for Carbureted Engines AccuNOx Series Product Brochure, copyright 1998.
Altronic Air/Fuel Ratio Control for Carbureted Engines EPC-100 Series Product Brochure, Altronic Inc., copyright 2002.

* cited by examiner

FUEL CONTROL SYSTEM AND METHOD FOR GAS ENGINES

RELATED APPLICATION

The present application claims the benefit of co-pending U.S. provisional patent application No. 60/975,742 filed Sep. 27, 2007, which is incorporated herein by reference in its entirety.

BACKGROUND

1. Field of the Invention

This invention relates generally to devices and systems for mixing natural gas or any gaseous fuel with air in the correct proportions for combustion in a gas engine, and is particularly concerned with a fuel control system and method for controlling a natural gas engine for the purpose of reducing exhaust emissions and improving engine performance.

2. Related Art

The main concern that engineers had when designing the older engines and their fuel systems was engine performance and durability without any regard for exhaust emissions. Over the years numerous systems for controlling emissions have evolved utilizing a catalytic converter, an exhaust gas sensor, and a fuel modulating system to control the mixture for reduced emissions.

Some of the prior art devices that have been used rely on various types of supplemental fuel metering, biasing on pneumatic pressure regulator, or limited throttling of the main fuel supply. They have required substantial amounts of external support equipment and electrical interconnections. They have suffered from slow response and generally have not been particularly easy, convenient or economical to install, operate or use. Few have had any significant degree of self-containment or full fuel authority.

SUMMARY

In one embodiment, a fuel control system for a natural gas or other gaseous fuel engine comprises an air/fuel mixing venturi which supplies an air/fuel mixture to the engine, the venturi having a reduced area throat, an air supply inlet, and a plurality of gas fuel injection ports at the venturi throat, whereby gas flows through the injection ports to the venturi throat as a function of flow of air through the air supply inlet, a fuel metering assembly which controls the supply of gaseous fuel to the gas fuel injection ports of the air/fuel mixing venturi, an air/fuel ratio control module which establishes a first differential pressure setpoint between gaseous fuel and air inputs to the air/fuel mixing venturi, the first differential pressure setpoint being adjusted as a function of an engine operating parameter, a first differential pressure sensor which detects a differential pressure between the actual pressure of fuel supplied to a fuel inlet of an air/fuel mixing venturi and the air inlet pressure to an air inlet of the venturi, and a first pressure control module associated with the air/fuel ratio control module and first differential pressure sensor which controls the fuel metering assembly to vary the injection pressure of gaseous fuel supplied to the air/fuel mixing venturi based on differences between the first differential pressure setpoint and the detected differential pressure.

The parameter which is used to adjust the first differential pressure setpoint in one embodiment is exhaust oxygen level measured with an exhaust oxygen sensor. An exhaust oxygen level setpoint is first established based on the engine's operating characteristics. This may be done using emissions test data. This setpoint is then provided to a comparator which is also connected to the exhaust oxygen sensor, and the comparator output is used by the air/fuel ratio control module to vary the first differential pressure setpoint based on variations between the predetermined oxygen level setpoint and the detected oxygen level. In alternative embodiments, other sensors could be used to measure other gaseous exhaust components such as CO, $CO_2$, NOx, and unburned hydrocarbons (HC). In another alternative embodiment, the engine operating parameter may comprises an actual air/fuel ratio calculated based on outputs of a differential pressure sensor between the throat and air inlet to the venturi and a differential pressure sensor between the throat and fuel inlet to the venturi. The actual or calculated air/fuel ratio is compared to a predetermined air/fuel ratio setpoint, and the first differential pressure setpoint is varied based on differences between the detected air/fuel ratio and the air/fuel ratio setpoint.

According to another aspect, a fuel control system for a gas engine provides multiple control functions that are interrelated and is embodied in a gaseous fuel control assembly or unit, which includes a fuel metering assembly, a venturi mixer assembly, a throttle assembly, and an electronic control assembly. An electronic governor which has a throttle actuator which controls the throttle valve may also be provided in the assembly rather than as a separate body. The electronic governor in one example is controlled by the same control assembly which controls fuel metering. The control assembly may have separate control loops which control fuel supply to the venturi mixer assembly and operation of the governor. The two control loops are linked in one embodiment.

This fuel control system is designed specifically for small natural gas engines but may be scaled to work with larger engines. These engines are typically used for power generation, combined cycle (heat and power) applications, gas compression, pump drives, off-road and highway vehicles, and many other stationary mechanical drive applications. The unitary fuel control system may provide a cost effective solution to control the fuel of natural gas engines and may be adjusted to operate in either a rich-burn or a lean-burn mode. Rich-burn or stoichiometric operation uses only the chemically correct amount of air required to burn all the fuel entering the engine, while lean burn operation requires additional air which is not used in the combustion process. The system can maintain a constant or close to constant air/fuel mixture with fast recovery from load or speed transients. When the fuel control system is used on an engine equipped with an appropriate catalytic converter, it can help in complying with strict NOx and CO emissions requirements.

The emissions limits set by government agencies are quite different, depending on the country and location within the country. The current emissions limits for natural gas engines in Southern California Air Quality Management District are as follows:

NOx equal to, or less than 0.15 grams/Horsepower Hour (HP Hr)

CO equal to, or less than 0.6 grams/HP Hr

HC equal to, or less than 0.6 grams/HP Hr

It is possible to meet or exceed these requirements with rich-burn engines operating with closely controlled air/fuel mixture and a suitable 3-way catalytic converter. In one embodiment, the fuel control system operates in a rich-burn mode and is used in conjunction with an oxygen ($O_2$) sensor to maintain operation of an engine equipped with a catalytic converter, within established emissions limits.

In many geographic locations in the US and other countries, the emissions requirements are not as stringent as discussed above. In these locations, lean combustion may be adequate for emissions control. Lean combustion is when the engine is operated with a very lean air/fuel ratio, which is possible when excess air is available and used for combustion. The excess air passes through the engine and the oxygen is not all consumed in the combustion process. The excess air is compressed in the power cylinders, which increases the specific heat of the air/fuel charge so that the combustion flame temperature is reduced. Secondly, the increased mass air flow carries the heat away and the combustion takes place at a cooler temperature. The NOx is formed as a function of gas combustion temperature. By reducing the temperature of the flame and resulting end gas, the NOx is dramatically reduced and the CO emissions are small, because the excess oxygen in the exhaust further oxidizes the CO to $CO_2$. It is anticipated that 30% to 35% excess air may yield emissions of less than 2 gr/Hp Hr of NOx and very low CO and unburned hydrocarbons.

There are some advantages of operating the engine in a lean-burn mode, if permitted by local emissions requirements. For example, the engine is more efficient and saves fuel, and engine maintenance is greatly reduced because of the reduced operating temperature. The life of the engine is extended, and the use of a catalytic converter is not required. Because less fuel is burned, less $CO_2$ is generated and exhausted to the atmosphere.

In order to be operated in lean-burn mode, the following engine conditions must exist:
1) The engine must be de-rated in power, or be capable of generating or pumping excess combustion air.
2) The engine ignition system must be capable of igniting a lean mixture.
3) The fuel control system must be adjustable to run the engine lean, i.e. so that there is unburned oxygen in the exhaust. The excess oxygen is the result of excess air in the air/fuel mixture at the intake of the engine.

The unitary fuel control system in one embodiment is a single unit made to mount directly on the intake manifold, and can directly replace the mechanical carburetor, the fuel pressure regulator and the governor, which typically were provided as separate units in the past. The electronics and software which control the operating characteristics may be contained within an electronics chamber in the unit. A single body simplifies the wiring and installation. The single unit or body also makes it possible to optimize or improve the design, so the governor and the fuel system work well together for all applications. The body may have one or more housing parts which are suitably secured together to form the unitary body, with the various assemblies located in different chambers or regions of the body.

In one embodiment, the fuel control unit also includes a pressure transducer, used to measure the pressure at the throat of the venturi to provide a volumetric flow measurement. The flow measurement is used for load compensation. It makes it possible to load share or balance, where two fuel systems are used on one engine. The governor uses the load signal in a feed forward technique to improve the load transient capability and to change the gain of the governor as a function of load to stabilize the governor action at all loads. The transducer can also be connected to measure the engine manifold pressure as an alternative way to indicate load.

The fuel control system in one embodiment is an electronic air/fuel ratio system combined with an electronic governor designed specifically for small natural gas engines, in a single unit. The system is comprised of three main components, a venturi mixer assembly, a fuel metering assembly, and an electronic control assembly that work together to provide control of the fuel-air ratio in response to an oxygen sensor located in the exhaust. The governor function is included in the electronic control assembly. A load signal from a built-in transducer that measures volumetric air flow though the mixing venturi may also be included. The load sensor can alternatively be connected to measure the manifold pressure as an indication of load.

The air entering the engine passes through the venturi mixer. The venturi shape of the mixer is designed to produce a low pressure at the throat of the venturi. This throat pressure is used to draw the fuel through the injection ports into the air stream. The pressure is also an indication of air flow. The fuel supply to the injection ports of the venturi may be controlled to provide a desired chemical mixture at all load and speed conditions when running in a rich-burn mode. A valve associated with the venturi mixer in one embodiment can be adjusted to operate the engine in a lean-burn mode.

The fuel gas supply pressure may be between 0.2 PSIG (pounds of pressure per square inch gauge) and 2 PSIG at the gas inlet to the electronic pressure regulator. A precise differential pressure sensor measures the differential pressure between the inlet fuel and air pressures at the venturi fuel and air inlets. The differential pressure sensor detects the difference between these signals and the differential pressure signal is compared to a setpoint in the electronic system. The controller adjusts the pressure to match the setpoint. The result is that, when air flows through the mixer, a lower pressure is developed in the throat of the mixer (venturi) which draws the correct amount of fuel into the air stream to provide the correct mixture for desired operation. The air/fuel mixture is then trimmed by the software adjusting the setpoint of the electronic pressure regulator based on the oxygen content in the exhaust as measured by a wide range $O_2$ sensor located in the exhaust stream, before the catalytic converter.

The action normally desired from the fuel control system is to maintain a constant fuel mixture by control of the fuel metering assembly. As an independent function, one embodiment includes a speed governor which controls a throttle or butterfly valve to admit the mixture to engine to maintain the speed of the engine. Interaction can occur between the speed governor and the air/fuel system in lean-burn systems, causing the engine speed to be unstable. The operation of the air/fuel control may be made more responsive to reduce this problem, that is, so that the air/fuel control responds faster than the speed governor. The desired action is for the fuel mixture to be constant while the governor meters the quantity of mixture required to maintain the desired speed. The governor may be designed to be fast enough to carry the required load transients that occur.

In one embodiment, the governor is controlled by the same computer as the fuel metering assembly. Lean-burn operation is very desirable, because of the savings in fuel and maintenance and is used in those applications that permit. However, when running very lean to comply with the emissions requirements, the engine may not have good on-load transient capability. In other words, if the engine load increases suddenly, it may slow down or even stop running. The electronic governor in one embodiment may be adapted to first open the throttle plate to a maximum position. If there still is not enough power to maintain the engine speed, the control system raises the fuel injection pressure, which adds fuel to the mixture. This added fuel burns and increases the torque capability of the engine to maintain speed during the required load transients. When the engine speed stabilizes at the new load, the fuel mixture slowly "leans out" to get the best fuel economy. This arrangement provides the ability to add fuel when the throttle plate (butterfly valve) reaches the full throttle position. This is not possible with the currently available control systems.

The above arrangement provides a complete fuel control system used for mixing natural gas or any gaseous fuel with air as a pre-mixed fuel for a natural gas engine. The system includes a sensor in combination with an air-fuel ratio controller to adjust the air-fuel mixture to reduce or minimize the undesired pollutants in the exhaust, helping to improve performance of the engine, reducing exhaust emissions to an environmentally acceptable level, and providing diagnostic information for maintenance of the fuel system and the engine. If the application requires the use of a governor, it is beneficial to incorporate the governor in the fuel control system because the time constant of the fuel mixing function interacts with the time constant of the governor function. To prevent this interaction, the time constant of the fuel mixing function is kept very short and the time constant of the governor is longer. With the two functions in the same unit they can be adjusted and tuned on the test bench so that the unit works in a stable manner when it is installed on the engine.

The fuel control system combines control functions that formerly have been omitted or were not possible in fuel systems consisting of distributed or separate components. The combination makes it possible to share data between sub-systems which enhances the overall control of the engine. In one embodiment, all the control functions are combined into a single unit which has no range limitations and eliminates or reduces the problems of the previous systems. This system can be calibrated on a test bench. When installed on an engine it requires no further adjustment. This fuel system has an additional advantage of being able to run at any air fuel ratio between stoichiometric (rich burn) and very lean.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a fuel control or gaseous carburetor system which provides control of the fuel-air ratio in an engine. In some embodiments, the system may also include an integral throttle body and a governor which controls the butterfly or throttle valve, and which is operated by the same controller which controls the fuel-air ratio.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 2:
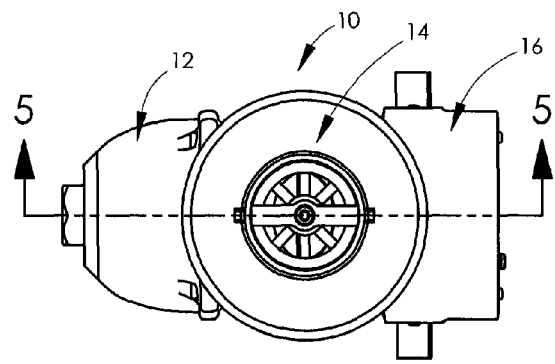
FIG. 2 is a top view of the device of FIG. 1.
Figure 1:
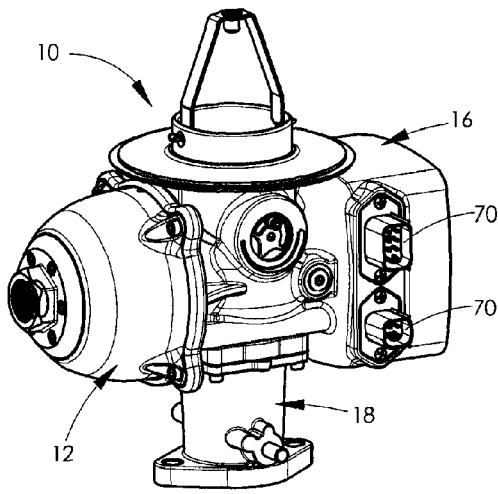
FIG. 1 is an isometric view of a gaseous carburetor assembly or fuel control system according to one embodiment.
Figure 3:
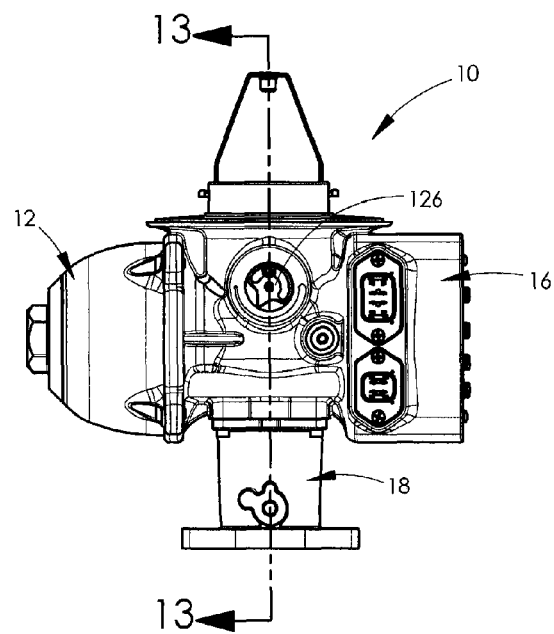
FIG. 3 is a front view of the device of FIG. 1.
Figure 4:
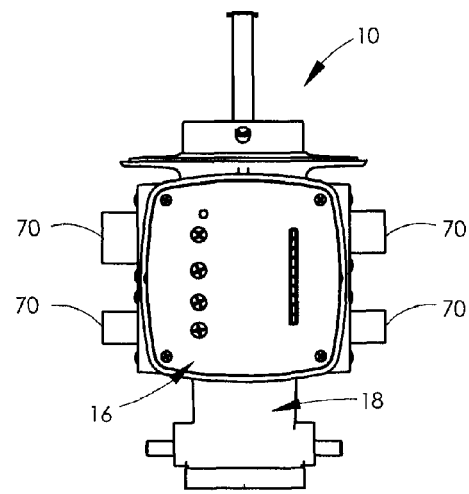
FIG. 4 is a right side view of the device of FIG. 1.
Figure 5:
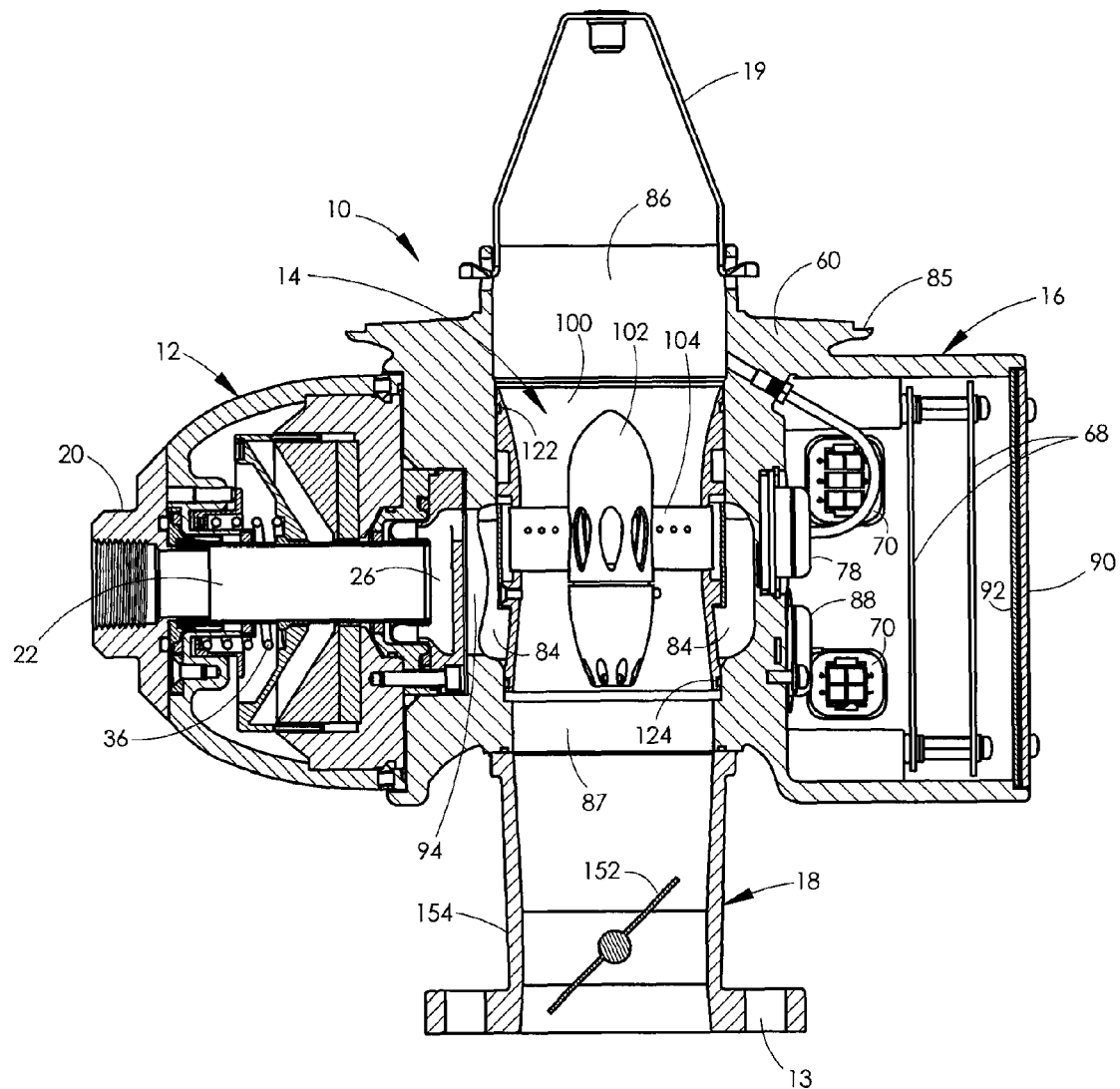
FIG. 5 is a cross-section on the lines 5-5 of FIG. 2.
Figure 6:
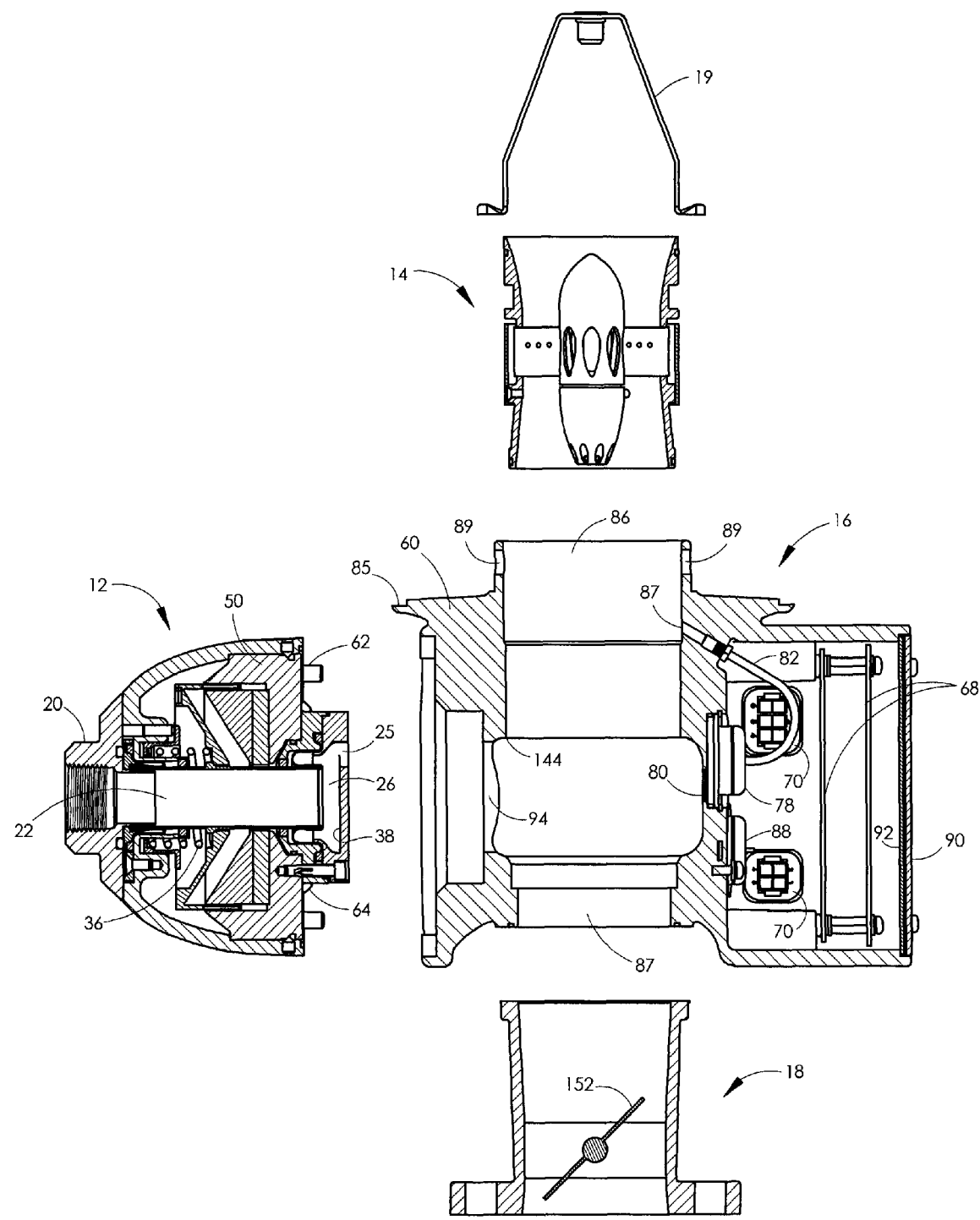
FIG. 6 is a cross-section similar to FIG. 2 but showing the fuel metering assembly, the venturi mixer assembly, the throttle assembly and the air filter bracket separated from the electronics assembly.
Figure 20:
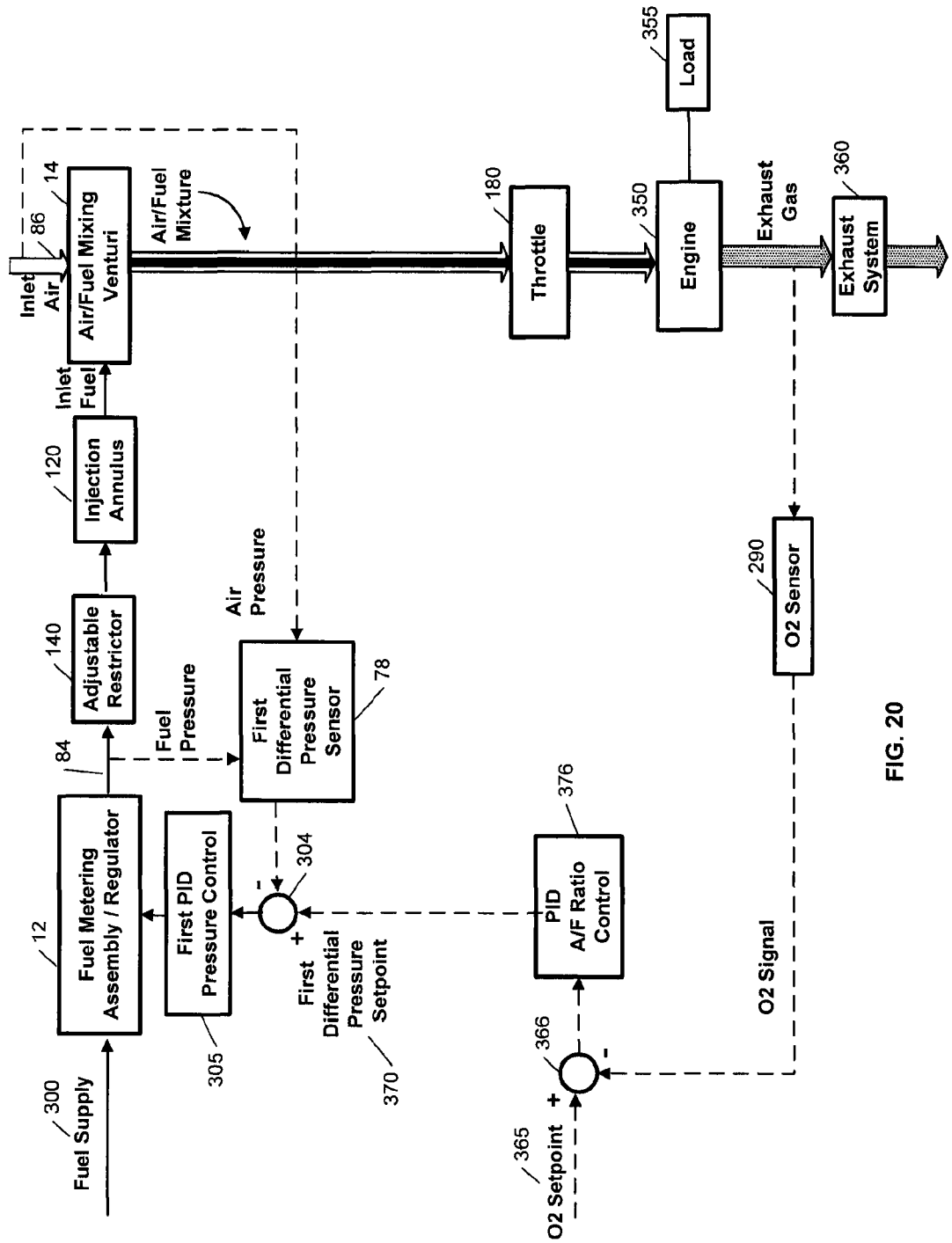
FIG. 20 is a block diagram of one embodiment of an electronic control system for controlling the air/fuel ratio in a carburetor assembly such as the assembly of FIGS. 1 to 19.
Figure 21:
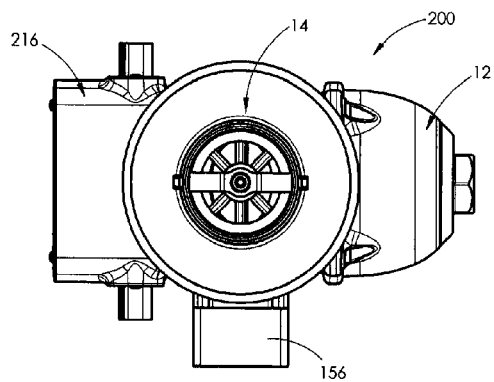
FIG. 21 is a top view of a fuel control or carburetor assembly according to an alternate embodiment.

FIGS. 1 to 19 illustrate one embodiment of a gaseous carburetor or fuel control assembly 10, which supplies a fuel air mixture to a gas engine. The gaseous carburetor assembly 10 is comprised of four main assemblies: the fuel metering assembly 12, the venturi mixer assembly 14, the electronics assembly or control system 16, and the throttle assembly 18, as illustrated in more detail in FIGS. 5 and 6. These assemblies are secured together as a single body and are formed in separate housings as indicated in FIG. 6, which are suitably fastened together by bolts or the like, as indicated in FIGS. 1 to 5, although they may be provided in a single integral housing in alternative embodiments. The assembly can be mounted on an engine intake manifold via fastener openings 13 at the lower end of throttle assembly 18, as illustrated in FIG. 5. The venturi mixer assembly 14 may be similar to that described in U.S. Pat. No. 7,410,152 issued on Aug. 12, 2008, the contents of which are incorporated herein by reference. One embodiment of the control system or electronics assembly 16 for controlling the carburetor assembly 10 is illustrated in FIG. 20 and described in more detail below. Although the electronics assembly is integrated in assembly 10 as a single unit with the other components of the gaseous carburetor, it may alternatively be incorporated in a separate unit mounted elsewhere on or near the engine.

Figure 7:
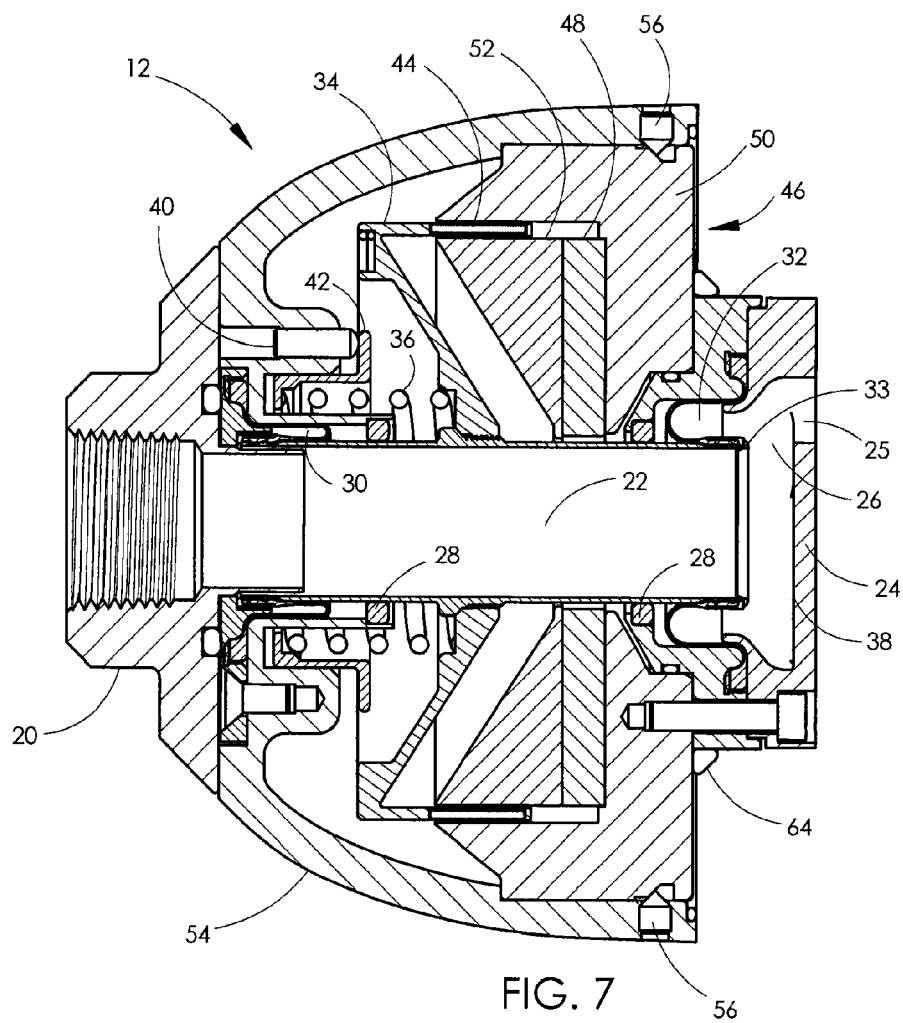
FIG. 7 is an enlarged view of the fuel metering assembly of FIG. 6 with the metering tube in an open position.
Figure 8:
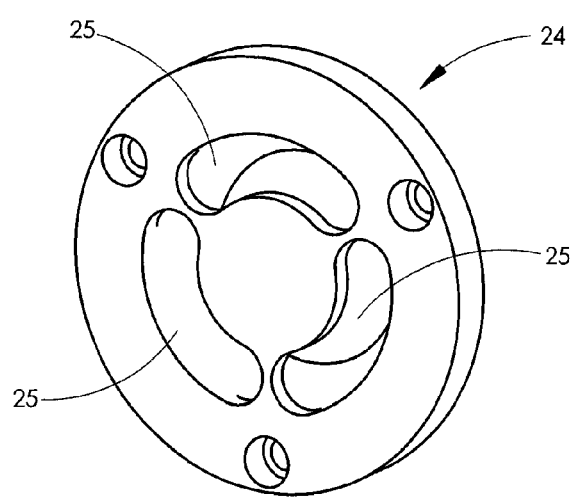
FIG. 8 is an isometric view of the metering seat.
Figure 7B:
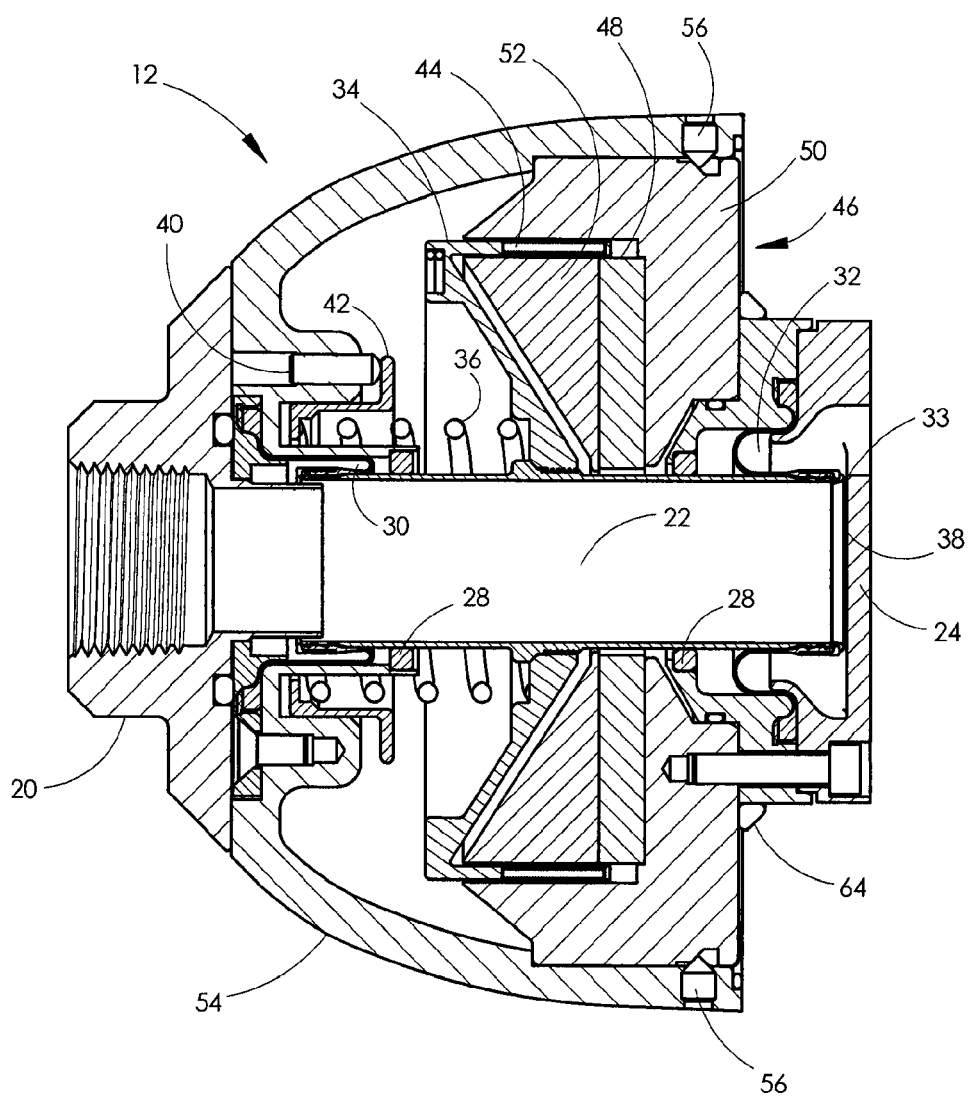
FIG. 7B is an enlarged view of the fuel metering assembly of FIG. 6 with the metering tube in a closed position.
Figure 9:
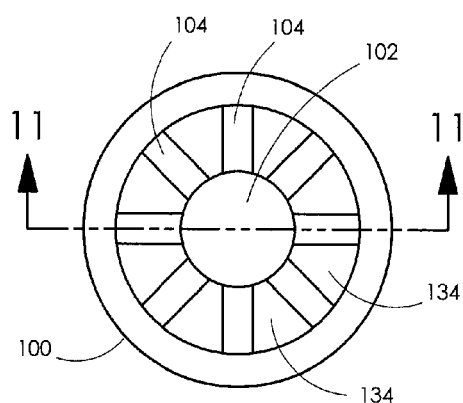
FIG. 9 is a top view of the venturi mixer assembly of FIG. 6.
Figure 10:
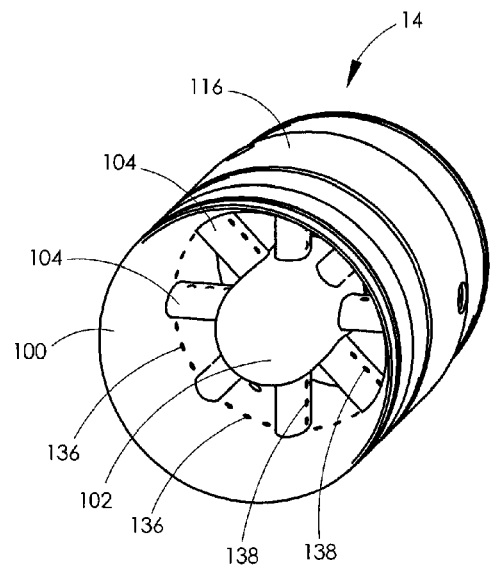
FIG. 10 is an isometric view of the venturi mixer assembly of FIG. 6.
Figure 11:
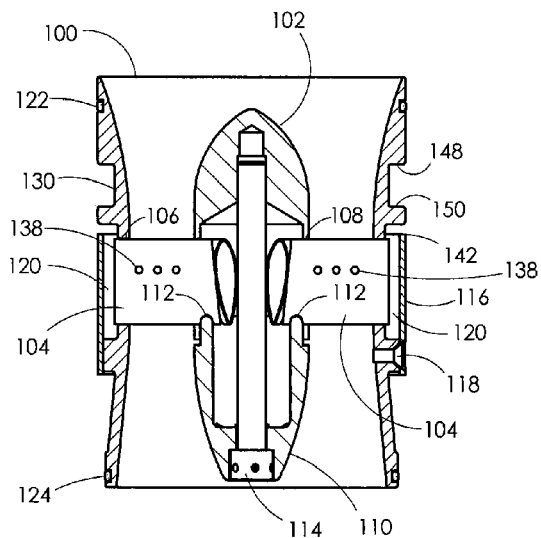
FIG. 11 is a cross-section on the lines 11-11 of FIG. 9.
Figure 12:
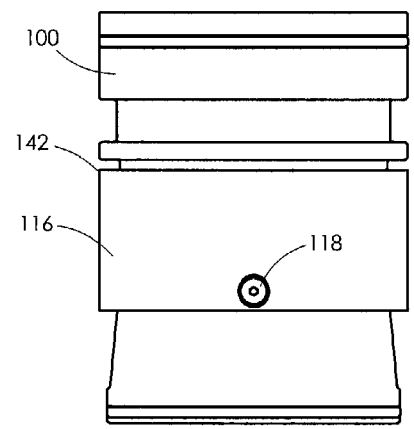
FIG. 12 is a side view of the venturi mixer assembly of FIG. 6.
Figure 13:
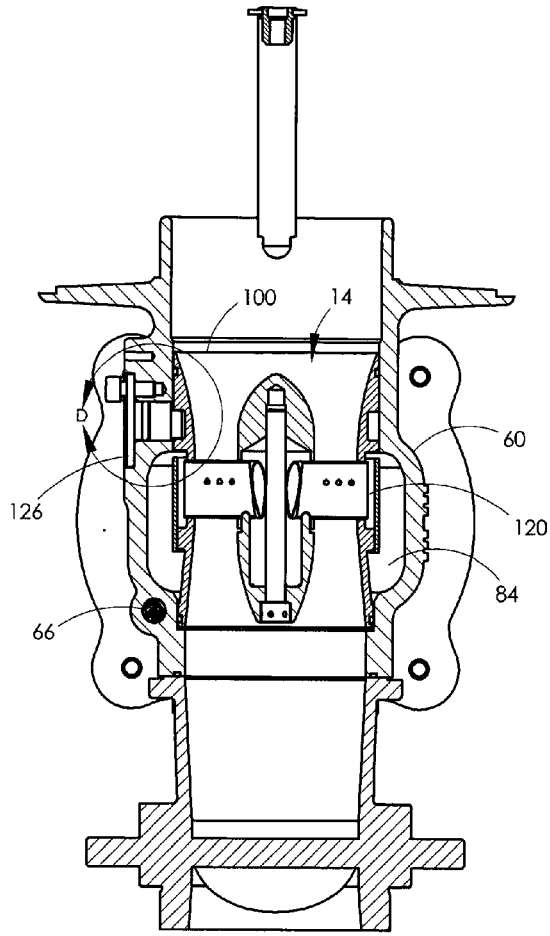
FIG. 13 is a cross-section on the lines 13-13 of FIG. 3 showing the venturi assembly adjusted to a fully open position.
Figure 14:
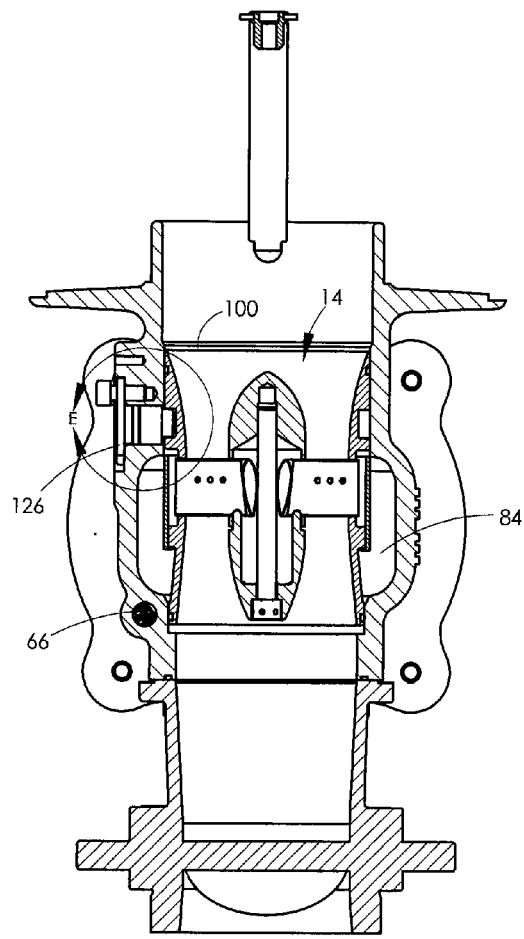
FIG. 14 is a cross-section similar to FIG. 13 showing the venturi assembly adjusted to a near closed position.

Referring to FIGS. 6, 7 and 8, the fuel metering assembly 12 controls the amount of gaseous fuel supplied to the venturi mixer assembly 14. Fuel enters the inlet flange 20, continues through the metering tube 22, and exits the passages 25 of the metering seat 24. Metering tube 22 is supported by the bushings 28 and is sealed at each end with the inlet diaphragm 30 and the outlet diaphragm 32. Adjusting the axial location of metering tube 22 and metering edge 33 of outlet diaphragm 32 with respect to surface 38 of metering seat 24 controls the area of passage 26 and in turn the fuel flow. The return spring 36 normally locates metering tube 22 into a closed position where metering edge 33 of outlet diaphragm 32 is forced against surface 38 of metering seat 24, as illustrated in FIG. 7B. The force of return spring 36 can be adjusted by rotating the preload screw 40, which changes the location of the spring cup 42. The actuator coil assembly 34 is attached to metering tube 22 and applies an axial force in the opposite direction of the force created by return spring 36. When an electrical current is applied to the coil windings 44, the interaction between the coil's magnetic field and the field of magnet assembly 46 creates a force sufficient to overcome the biasing force of return spring 36, and moves the metering tube into an open position, as illustrated in FIG. 7. Magnet assembly 46 includes the magnet 48, the magnet cup 50 and the pole piece 52. The magnet assembly 46 is mounted to the actuator housing 54 with set screws 56. The net force generated is proportional to the amount of electrical current applied to coil windings 44. Varying the amount of current applied to coil windings 44 controls the area of passage 26 and in turn the fuel flow.

Referring to FIGS. 5 and 6, actuator assembly 12 attaches to the main housing 60 of the electronics assembly 16 with screws 62. Fuel flow exiting metering seat 24 of fuel metering assembly 12 flows through passage 94 of main housing 60 and into the annulus 84 around the venturi mixer assembly 14. O-ring 64 provides a seal between actuator assembly 12 and main housing 60. Electrical wires from the coil assembly 34 (FIG. 7) run through passage 66 of main housing 60 (FIG. 13) and connect to the circuit board assembly 68 of electronics control assembly 16. External electrical inputs and outputs interface with the electronics assembly 16 via electrical connectors 70. The cover 90 and cover gasket 92 protect the electronics from the outside environment. Pressure sensor 78 measures the differential pressure between the fuel supplied to the venturi mixer assembly 14 at annulus 84 and the air entering venturi mixer assembly 14 at the venturi inlet 86. These pressures are ported to pressure sensor 78 via passage 80, passage 87 and conduit 82. As described in more detail below in connection with FIG. 20, the electronics assembly 68 includes a control system having a controller or microprocessor which is programmed to control the amount of current provided to the fuel metering assembly 12, and in turn the amount of fuel provided to the venturi mixer assembly 14, based on input signals from the pressure sensor 78 and an oxygen sensor mounted in the exhaust conduit of the engine. These input signals are used as variables in closed loop algorithms for controlling differential pressure and oxygen sensor setpoints, as described in more detail below in connection with FIG. 20. The microprocessor of circuit board assembly or control system 68 maintains a first differential pressure setpoint or gas fuel injection pressure setpoint by adjusting the flow exiting the fuel metering assembly 12 as described previously. In one embodiment, the first differential pressure setpoint is adjusted by the microprocessor in order to maintain the oxygen sensor setpoint. In other embodiments, as described below, the first differential pressure setpoint is adjusted based on other variables.

In some applications with near constant operating conditions and lenient exhaust emissions requirements, it is possible to run "open loop" without an exhaust oxygen sensor and without the air/fuel ratio control loop of FIG. 20. In this alternative embodiment, the first differential setpoint is a predetermined value based on exhaust emission tests. This embodiment is mainly applicable to lean burn applications, because the exhaust emissions in such applications are much less sensitive to changes in the air/fuel ratio than are stoichiometric applications using a catalyst.

As illustrated in FIG. 5, a second pressure sensor 88 in the electronics control assembly 16 can be used to measure the engine manifold pressure when required. An external conduit is used to communicate the manifold pressure of the engine to pressure sensor 88.

The venturi mixer assembly 14 is illustrated in more detail in FIGS. 9 to 12 and basically comprises a venturi body 100, a hub 102 concentrically located within venturi body 100, and a series of hollow spray bars 104 extending radially from hub 102 to venturi body 100. Spray bars 104 are pressed through slots 106 in the venturi body 100 and slots 108 in the hub 102. Slots 106 and 108 have the same profile as spray bars 104 and provide an intimate fit. Spray bars 104 are secured by the cap 110, which engages notches 112 of spray bars 104. Cap 110 is held in place by screw 114 and the resulting assembly is made rigid by torqueing screw 114 until cap 110 has firmly seated into the notches 112 of spray bars 104. A venturi sleeve 116 slides over the venturi body 100 and is held in place by screws 118 to form injection annulus 120 between the venturi sleeve 116 and the venturi body 100.

Referring to FIGS. 5, 11, 13 and 15, the venturi mixer assembly 14 is installed into the main housing 60 and is sealed at each end with o-rings 122 and 124 which prevent fuel from exiting annulus 84 between the venturi mixer assembly 14 and the main housing 60. A venturi adjuster 126 is slidably engaged in a radial bore 128 which extends through main housing 60, and engages in a groove 130 of venturi body 100, as illustrated in FIGS. 13 to 16. The venturi adjuster 126 is illustrated in more detail in FIGS. 17 to 19 and comprises a plate-like member 127 having an arcuate slot 147 and an eccentric boss 146 projecting from one side of the plate-like member adjacent the slot. Boss 146 extends through the bore 128 while plate-like member 127 engages in a recess on the outer surface of housing 60. Boss 146 is sealed in bore 128 with o-ring 134 and secured to the main housing 60 by tightening screw 132 which extends through slot 147 into an aligned hole in the housing. Once secured, the venturi adjuster 126 prevents the venturi mixer assembly 14 from moving axially in the main housing 60. The venturi adjuster is adjusted prior to securing to the housing to control the size of a fuel supply passage 140 (FIG. 15) based on measured engine parameters, as discussed below.

As shown in FIGS. 5 and 6, an air filter bracket 19 mounts into holes 89 of main housing 60 and serves as the attachment point for hardware used to mount the engine's air filter. The air filter seats on face 85 of main housing 60.

During operation, all air entering the venturi air inlet 86 must flow through the passages 134 between the spray bars 104, the venturi body 100 and the hub 102 (see FIGS. 5, 9, 10 and 11). Passages 134 have the smallest cross-sectional area for air flow through the venturi mixer assembly 14, which results in the highest air velocity and the lowest pressure. The fuel ports 136 in the venturi body 100 and fuel ports 138 in the spray bars 104 are located in these areas of low pressure within passages 134. As the air flow in passages 134 increases so does the pressure drop across fuel ports 136 and 138, causing a proportional increase in fuel flow, which mixes with the passing air. When passages 134 and fuel ports 136 and 138 are sized correctly, a zero psi pressure differential between the venturi air inlet 86 and fuel ports 136 and 138 of the venturi results in a nearly constant air/fuel ratio, independent of engine load. This is beneficial because the carburetor is only required to make minor adjustments to this differential pressure in order to maintain the correct mixture. In contrast, an improperly sized venturi would result in large air fuel ratio errors during load transients. The carburetor must then wait for the oxygen sensor to indicate an error before making corrections. This additional lag can result in the exhaust emissions spiking out of compliance for an unacceptable period of time. If the venturi is sized correctly, as described above, the air fuel ratio remains nearly constant during load transients and the oxygen sensor control loop is only required to make minor adjustments to the venturi fuel inlet pressure or first differential pressure setpoint. The end result is improved engine performance and lower exhaust emissions. Application variables, such as fuel composition, fuel temperature, and air temperature, would require numerous sizes of fuel ports 136 and 138 in order to run with a constant zero psi pressure differential. This problem is reduced or solved by over sizing the fuel ports 136 and 138 and restricting the fuel flow upstream with variable restrictor or passage 140. The effective venturi fuel inlet area is based on the accumulated pressure drop of fuel ports 136 and 138 and the variable restriction 140. The resultant fuel inlet area can now be adjusted to achieve the desired pressure differential between the annulus 84 and venturi air inlet 86, which is normally zero psi but may vary from zero in some cases, depending on the engine operating parameters.

Figure 15:
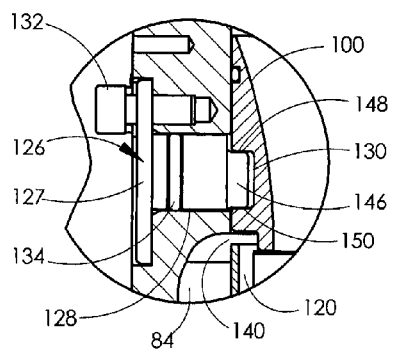
FIG. 15 is an enlarged detail view of circled area D of FIG. 13.
Figure 16:
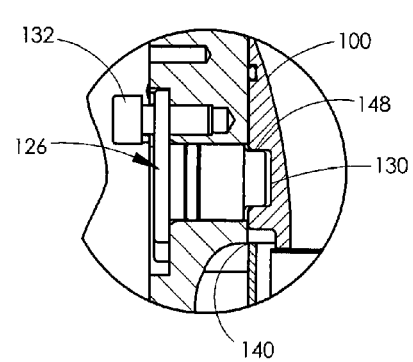
FIG. 16 is an enlarged detail view of circled area E of FIG. 14.
Figure 17:
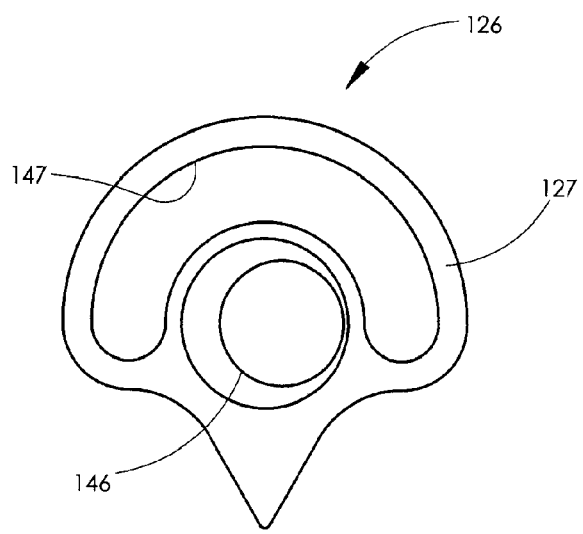
FIG. 17 is a top view of the venturi adjuster of FIG. 15.
Figure 18:
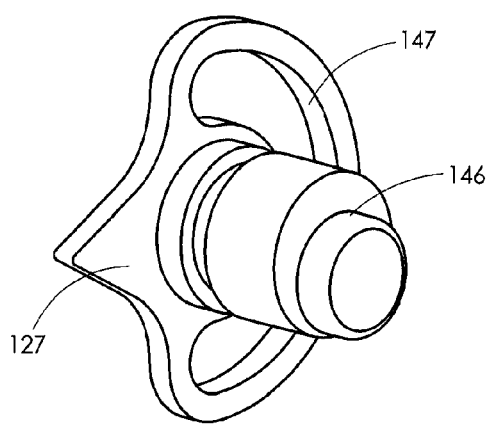
FIG. 18 is an isometric view of the venturi adjuster of FIG. 15.
Figure 19:
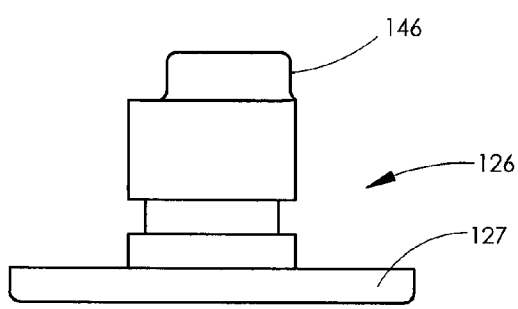
FIG. 19 is a front view of the venturi adjuster of FIG. 15.

The variable restrictor or passage 140 (FIGS. 15 and 16) is located between the edge 142 of venturi sleeve 116 (FIGS. 11 and 12) and the edge 144 of the main housing 60 (FIG. 6), and is manually controlled by venturi adjuster 126. All fuel entering the venturi mixer assembly 14 must pass from annulus 84, through passage 140 and into annulus 120. The size of passage 140 is adjusted by changing the axial position of the venturi mixer assembly 14 in relation to the main housing 60. As the venturi adjuster 126 is rotated, the eccentric boss 146 of adjuster 126 engages edge 148 or 150 of venturi body 100. Further rotation of adjuster 126 moves the venturi mixer assembly 14 either up or down in the axial direction depending upon the direction of rotation. Full stroke of the venturi mixer assembly 14 is achieved with 180 degrees of rotation of venturi adjuster 126. FIGS. 15 and 16 show passage 140 adjusted to a fully open position and a nearly closed position, respectively. Once the desired passage size is reached, the adjuster is secured in position by tightening screw 132.

Referring to FIG. 5, the air/fuel mixture exiting venturi mixer assembly 14 passes through the venturi outlet 87 of main housing 60 and through the throttle assembly 18 before entering the engine. An internal or external electronic governor and actuator may control the butterfly valve 152 of throttle assembly 18.

Figure 25:
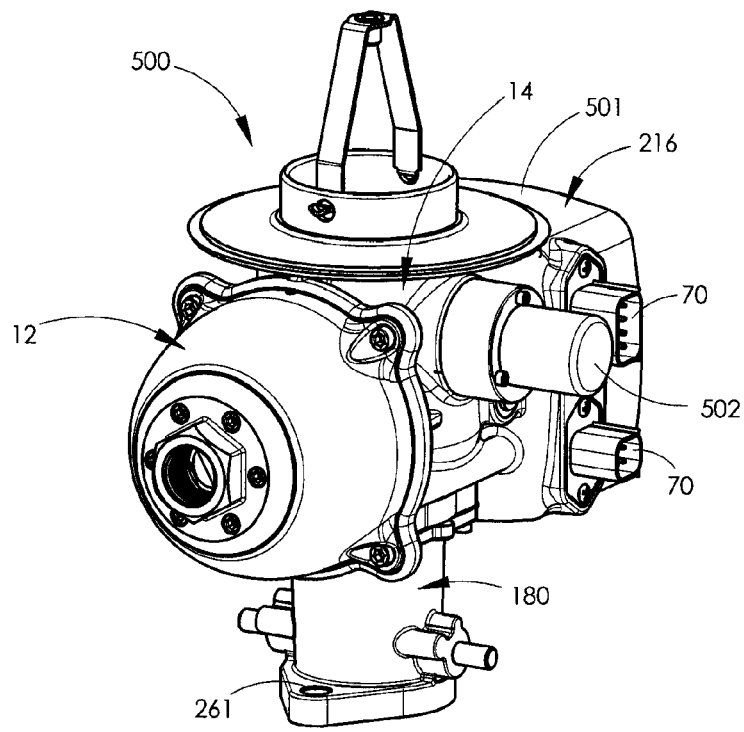
FIG. 25 is a perspective view of a modified fuel control assembly or carburetor including an automatic actuator for control of the venturi fuel inlet area.
Figure 26:
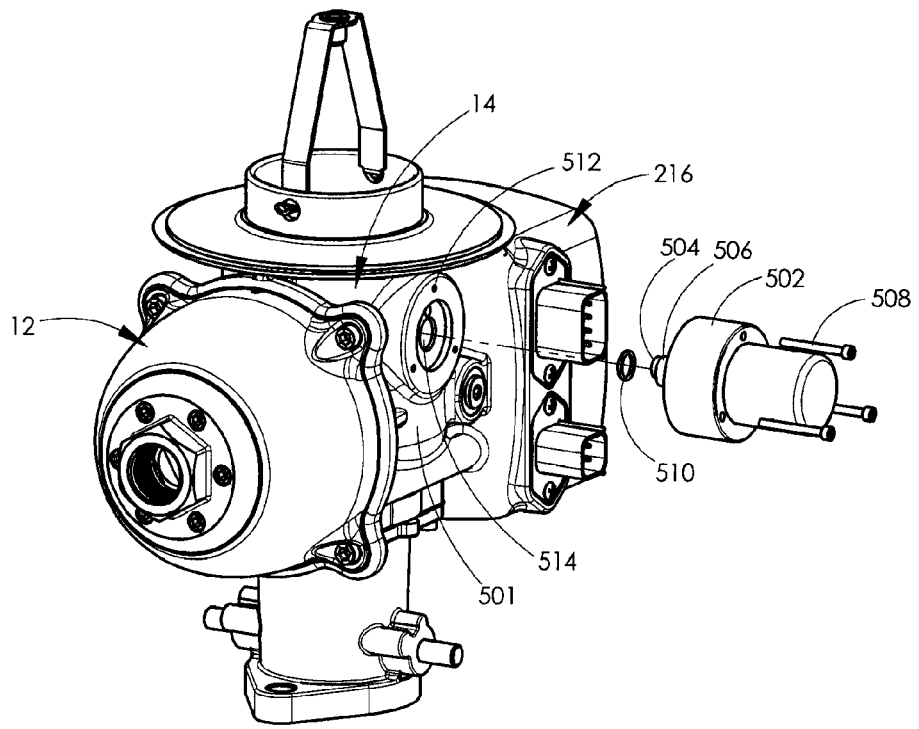
FIG. 26 is a view similar to FIG. 25 illustrating the automatic actuator separated from the remainder of the body.
Figure 31:
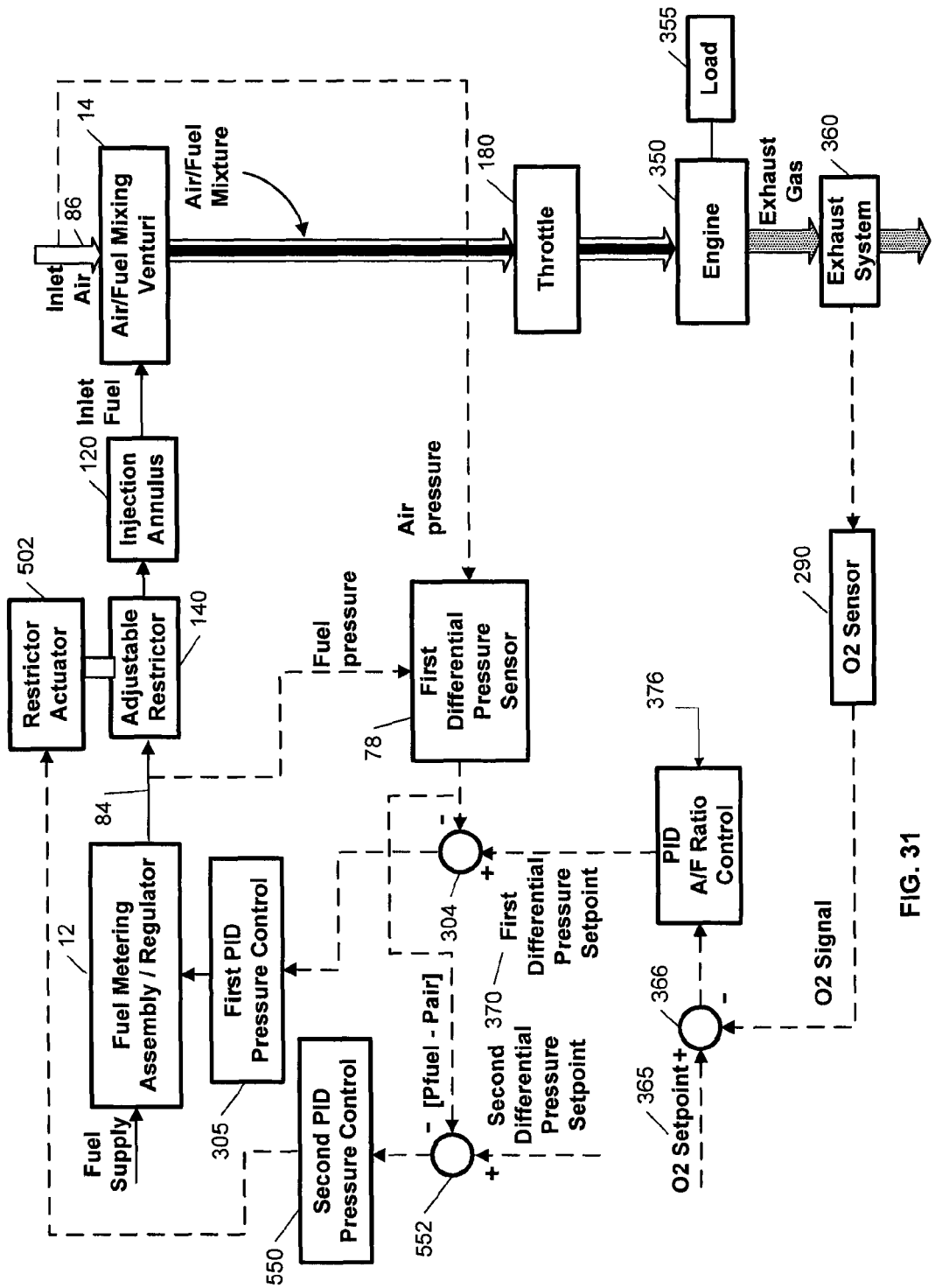
FIG. 31 is a block diagram illustrating another modified electronic control system which is a modification of the system of FIG. 20 to include automatic adjustment of the venturi fuel inlet restriction to control the rotary actuator as described above in connection with FIGS. 25 and 26.

The above method of manually adjusting the size of restrictor or inlet 140 works well when the air and fuel temperatures and the fuel composition remain near constant. However, if one of these parameters changes significantly, the oxygen sensor output no longer matches the predetermined $O_2$ setpoint, and the air/fuel ratio controller automatically adjusts the first differential pressure setpoint away from the optimum zero psid value in order to maintain the correct air/fuel ratio. Now the differential fuel pressure is no longer constant and dependant on engine load. Readjustment is made by the air/fuel ratio controller after each load transient. This makes it more difficult to maintain the exhaust emissions during load transients. FIGS. 25 and 26 and FIG. 31 below describe an alternative embodiment which allows continuous adjustment of the inlet or adjustable restrictor 140 based on changing engine conditions.

FIG. 20 illustrates a functional block diagram of one embodiment of an electronic control assembly or system connected to a carburetor assembly for controlling the air/fuel ratio supplied to an engine 350. In the illustrated embodiment, the control system is connected to the carburetor assembly of FIGS. 1 to 19, but it may be used with other carburetor assemblies in alternative embodiments, which may have a fuel metering assembly or regulator, injection annulus, and/or air/fuel mixer different from those described above in connection with FIGS. 1 to 19.

In the system of FIG. 20, fuel is supplied from fuel supply 300 via the fuel metering assembly or regulator 12, annulus 84, and adjustable restrictor 140 to the injection annulus 120 of the air/fuel mixing venturi 14, while air is supplied to the venturi via the air inlet 86. Electronic components of the control system 16 can be mounted on a circuit board assembly 68 as illustrated in FIG. 5 and suitably connected by wiring to the outputs of any sensors. Referring to FIG. 20, the gas or fuel enters the fuel metering assembly or regulator 12 at the gas inlet 300. The differential pressure sensor 78 measures the difference between the fuel pressure at the annulus 84 of the main housing and the air pressure at the inlet 86 of the air/fuel mixing venturi 14. A first differential pressure setpoint 370 is compared to the detected differential pressure at the output of sensor 78 in comparator 304. The error signal is connected to a pressure control module or first proportional-integral-derivative (PID) controller 305 in the software, and the controller provides an output current to the actuator coil assembly 34 in the pressure regulator or fuel metering assembly 12. The current supplied to the windings of the coil assembly controls the area of fuel output passage 26 and in turn regulates the fuel gas pressure to the annulus 84 of the main housing 60.

In an alternative embodiment, the differential pressure sensor may be replaced with a sensor at the fuel inlet which senses the inlet pressure and assumes air pressure is constant. In this case, the first differential pressure set point is replaced by a first fuel pressure set point.

Air enters the venturi mixer 14 from the top. The air flowing through the throat of the venturi causes a reduced pressure in the area where the metering holes admit the fuel gas. The reduced pressure draws in a proportionate amount of fuel gas, which is thoroughly mixed with the air. The fuel-air mixture is admitted to the intake manifold of the engine 350 via a throttle assembly 180 and burned in the cylinders as they fire. At the same time, an oxygen sensor 290, located in the exhaust system 360, monitors the amount of oxygen present. The output of the oxygen sensor is suitably connected to the control assembly, for example via one of the electrical connectors 70. The measured oxygen is compared to an oxygen setpoint 365 at comparator 366 and the error signal is acted on by PID air/fuel ratio controller 376. The oxygen sensor setpoint is predetermined by engine emissions test data. It may either be fixed value or a variable based on an engine parameter such as load, or manifold pressure. The output of pressure setpoint or air/fuel ratio control module 376 modulates the first differential pressure setpoint or fuel injection pressure setpoint 370. Hence, the $O_2$ sensor 290 controls how much fuel is added to the air stream in a closed loop manner.

If the amount of oxygen detected in the exhaust gas is higher than the oxygen setpoint, this means that too much air is being supplied to the engine. The air/fuel mixture therefore needs to be richer, so detection of an oxygen signal from sensor 290 which is higher than the oxygen setpoint results in an increase in the first differential pressure setpoint 370, and thus an increase in the amount of fuel supplied to the venturi 14. Conversely, if the oxygen level is lower than expected, the first differential pressure setpoint 370 is lowered, resulting in supply of a leaner mixture to the engine.

Figure 22:
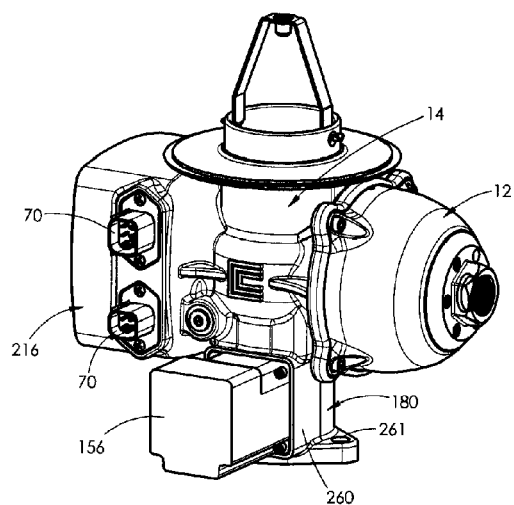
FIG. 22 is an isometric view of the device of FIG. 21.
Figure 23:
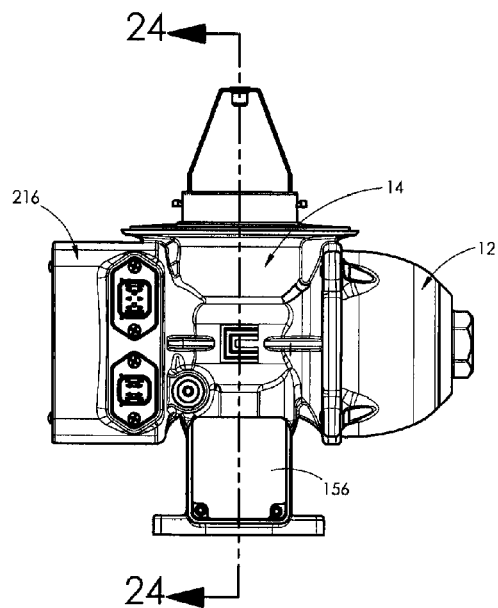
FIG. 23 is a front view of the device of FIG. 22.
Figure 24:
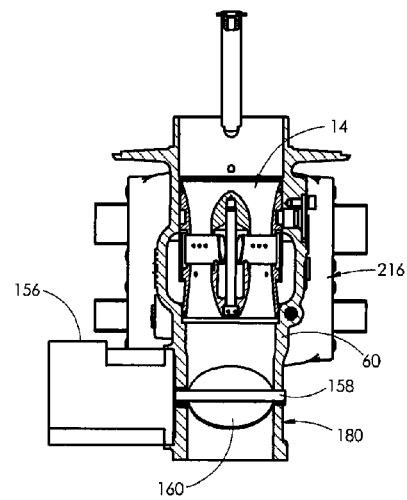
FIG. 24 is a cross-section on the lines 24-24 of FIG. 23.

FIGS. 21 to 24 illustrate another embodiment of a carburetor assembly. In this embodiment, the gaseous carburetor assembly of FIGS. 1 to 19 forms part of a unitary fuel control system 200 which can be mounted directly on an engine intake manifold. Parts of the system 200 are identical to parts in the previous embodiment, and like reference numerals have been used as appropriate. System 200 includes an integral throttle assembly 180 and governor actuator or throttle actuator 156 which is operated by the same electronic control assembly 216 and the fuel metering assembly 12. System 200 comprises fuel metering assembly 12, venturi mixer assembly 14, electronics assembly 216, and throttle assembly 180. The fuel metering assembly 12 and venturi mixer assembly 14 are identical to the previous embodiment. In this embodiment, the throttle assembly 180 is formed as an integral extension of the housing 260 which contains the electronics assembly 216 and in which the venturi mixer assembly 14 is mounted, and the fuel metering assembly 12 is attached to the housing 260 as in the previous embodiment. Housing 260 is designed for bolting onto an engine intake manifold via fastener openings 261, one of which is shown in FIG. 22.

Throttle actuator or governor actuator 156 is mounted to main housing 260, and the throttle shaft 158 of electric actuator 156 is coupled to the butterfly valve 160. Electric actuator 156 is wired directly to a microprocessor or controller in electronics assembly or control system 216 by a suitable electrical connector, such as an electrical connector 70 of the previous embodiment. The controller is programmed to control the position of butterfly or throttle valve 160 and the position of fuel metering tube 22 based on outputs from the pressure sensor 78, an exhaust oxygen sensor, and an engine speed signal or sensor. FIGS. 27 to 34 illustrate some examples of possible controllers or control systems for controlling the governor and the air/fuel ratio in the carburetor assembly of FIGS. 21 to 24, as described in more detail below.

FIGS. 25 and 26 illustrate a modified carburetor assembly 500 which is similar to the carburetor assemblies of the previous embodiments, and like reference numbers are used for like parts as appropriate. However, in this embodiment, the manual adjustment of venturi restriction 140 is made automatic by installing a rotary actuator 502, controlled by the electronic control system illustrated in more detail in FIG. 31, in place of the adjustment described above in connection with FIGS. 13 to 19. The carburetor assembly 500 of FIGS. 25 and 26 is shown without the governor actuator or throttle actuator 156 of FIGS. 21 to 24, but a governor actuator 156 may be included in alternative embodiments. The central processing unit of the control system located in main housing 501 is programmed to control the rotary actuator 502 so as to adjust the restriction 140 in order to maintain the detected differential pressure at a predetermined second differential pressure setpoint, which is zero psid in one embodiment, but may be different from zero in some embodiments. If the detected differential pressure (fuel inlet pressure minus air inlet pressure) between the air and fuel inlets is greater than the second differential pressure setpoint, the restriction area 140 is increased. If the detected differential pressure is less than the second differential pressure setpoint, the restriction area 140 is decreased. This adjustment takes place much more slowly than the adjustment of the fuel metering assembly based on oxygen level in the exhaust (FIG. 20), so that the fuel metering assembly can be adjusted quickly as needed to boost or reduce fuel to the venturi, but tends to move more slowly back to the second pressure differential setpoint over time, as described in more detail below in connection with FIG. 31. This is effective because the air and fuel properties typically change gradually throughout the day, allowing the adjustable restrictor control loop to be made relatively slow in relation to the fuel metering assembly control loop. This helps to eliminate undesirable interactions between these control loops. This also allows a small low power actuator to be used for adjusting the restriction. A geared stepper motor is one example of a suitable actuator. The automatic adjustment of the fuel inlet restriction allows the venturi to operate with optimum or close to optimum conditions where the fuel and air inlet pressures match independent of fuel composition, fuel temperature, air temperature, and engine load. While the fuel and air pressure differential is maintained at zero psid, the air/fuel ratio is nearly constant throughout the engine's load range, and the controller only needs to make minor adjustments to the fuel inlet pressure in order to achieve the required exhaust emissions.

In the carburetor assembly 500 of FIGS. 25 and 26, manual venturi adjuster 126 of the previous embodiments is replaced with the rotary actuator 502. Other parts of the assembly 500 are identical to parts in the previous embodiments, and like reference numbers are used for like parts as appropriate, and reference is made to the description of these parts in the previous embodiments in connection with the assembly 500.

Rotary actuator 502 has a shaft 506 which is rotated based on input from a modified control system in controller housing 216, as described in more detail below in connection with FIG. 31. The end of the shaft 506 of rotary actuator 502 has an eccentric boss 504, which is identical to boss 146 of FIGS. 13 to 19. Boss 504 passes through bore 514 of main housing 501 and engages venturi mixer assembly 14 in exactly the same way as shown in FIGS. 15 and 16 for the boss 146 of manual adjuster 126. The rotary motion of shaft 506 adjusts the axial position of venturi mixer assembly 14 in the same manner as the venturi adjuster 126 described above. Rotary actuator 502 is mounted to main housing 501 with the screws 508 which engage the threaded holes 512 of main housing 501. O-ring seal 510 is installed on shaft 506 to prevent gas from leaking through bore 514. Rotary actuator 502 is wired directly to a microprocessor or controller in electronics or controller housing 216 by a suitable electrical connector, such as electrical connector 70 of the carburetor assembly 10.

In one embodiment, a position sensor (not illustrated) may be provided on the rotary actuator 502, and may be used to provide a default start position for the venturi restrictor 140. A mechanical stop may be used to determine the initial reference position. The position sensor may also be connected to the control system and used for diagnostics to provide an indication of when the venturi adjustment is at the maximum or minimum adjustment, or if it becomes stuck in one position, indicating that maintenance is required.

Figure 27:
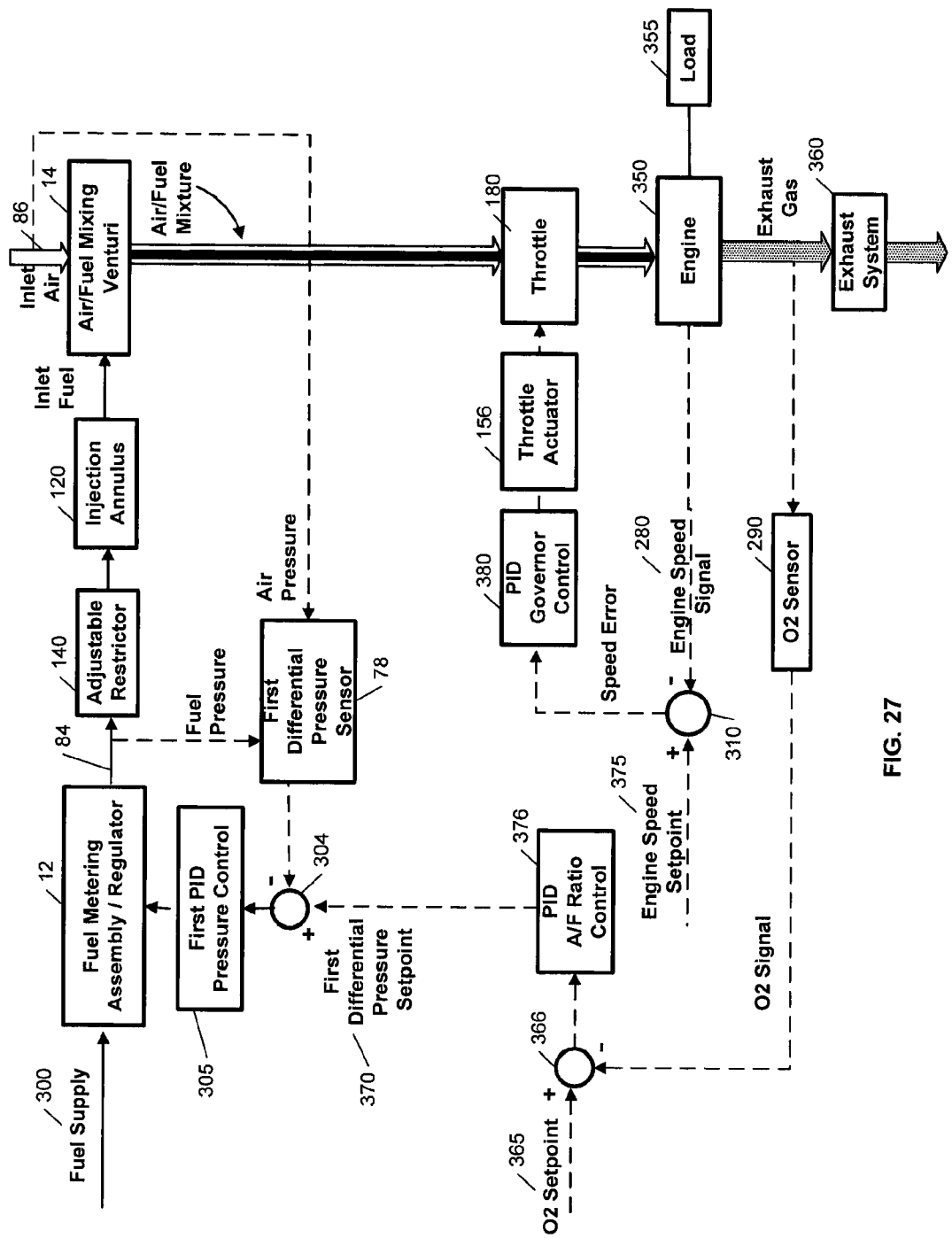
FIG. 27 is a block diagram illustrating a modified electronic control system in which a governor control is added to the basic carburetor system of FIG. 20, for controlling the air/fuel ratio in the carburetor assembly of FIGS. 21 to 24.

FIG. 27 illustrates a functional block diagram of a carburetor assembly including a governor or throttle actuator 156 as in FIGS. 21 to 24 and a first embodiment of a fuel control system or electronic controller for controlling air/fuel ratio in the carburetor assembly of FIGS. 21 to 24. As in the previous embodiment, electronic components of the control system can be mounted on a circuit board in the housing of electronics assembly 216. Some parts of the system of FIG. 27 are identical to the control system illustrated in FIG. 20, and like reference numbers have been used as appropriate. Referring to FIG. 27, the gas or fuel enters the fuel metering assembly or regulator 12 at the gas inlet 300. As in FIG. 20, the detected differential pressure between the fuel and air inlet pressures (as measured by the differential pressure transducer 78) is compared to the first differential pressure setpoint 370 in comparator 304. The error signal is connected to pressure control module or first PID pressure controller 305 in the software, and the computer provides an output current to the actuator coil assembly 34 in the pressure regulator or fuel metering assembly 12. The current supplied to the windings of the coil assembly controls the area of fuel output passage 26 and in turn regulates the fuel gas pressure to the annulus 84 of the housing 260. Air enters the venturi mixer 14 from the top. The air flowing through the throat of the venturi causes a reduced pressure in the area where the metering holes admit the fuel gas. The reduced pressure draws in a proportionate amount of fuel gas, which is thoroughly mixed with the air. The fuel-air mixture is admitted to the intake manifold of the engine 350 via throttle assembly 180 and burned in the cylinders as they fire. The oxygen sensor 290, located in the exhaust system 360, monitors the amount of oxygen present. The measured oxygen is compared to an oxygen setpoint 365 at comparator 366 and the error signal is acted on by PID air/fuel ratio control module or controller 376. The output of pressure setpoint or air/fuel ratio control module 376 adjusts the first differential pressure or pressure setpoint 370 up or down depending on whether the detected oxygen level is higher or lower than the oxygen setpoint, as described above in connection with FIG. 20. Hence, the $O_2$ sensor controls how much fuel is added to the air stream in a closed loop manner.

The functional block diagram of the electronic governor is also shown in FIG. 27. In one embodiment, an engine speed sensor provides a pulse for each tooth on the ring gear as the engine turns. An engine speed signal 280 from the speed sensor is amplified. The actual detected engine speed is compared to the speed request or speed setpoint 375 at comparator module 310, and an error signal is generated and connected to a governor PID controller 380 which controls the governor or throttle actuator 156 which drives the butterfly valve 160 in throttle assembly 180. If the detected engine speed is lower than the engine speed setpoint, the throttle actuator 156 is controlled to open the throttle and supply more of the air/fuel mixture to the engine. If the detected speed is higher than the engine speed setpoint, the throttle actuator 156 is controlled to reduce the size of the throttle opening.

Figure 28:
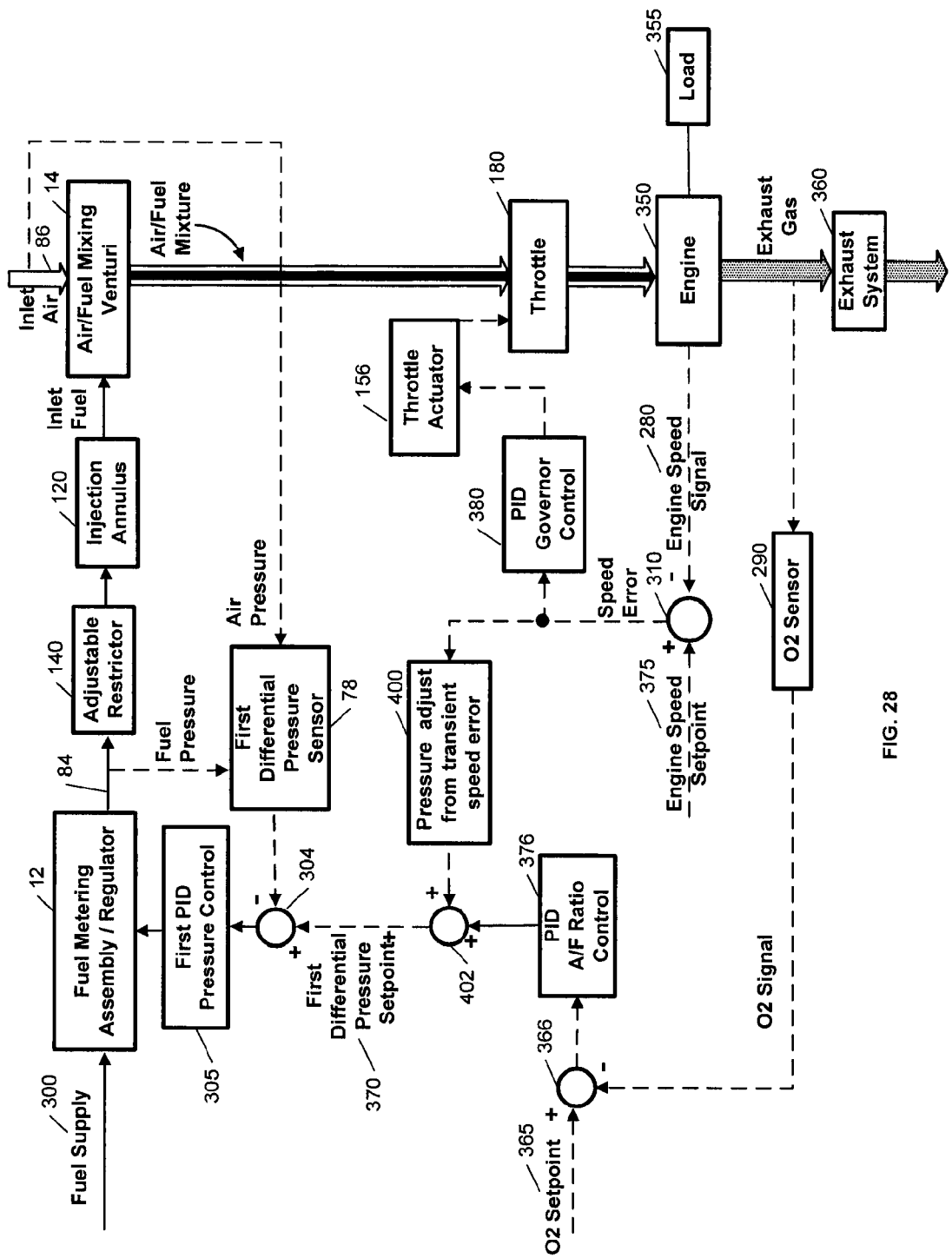
FIG. 28 is a block diagram illustrating a modification to the system of FIG. 27 adding a transient speed error adjustment.

FIG. 28 illustrates a modified control system in which the two control loops of FIG. 27 (the governor control loop which controls throttle opening and the fuel supply loop which controls fuel supply to the injection annulus) are linked. As illustrated in FIG. 28, any detected transient speed errors may also be used to control the first differential pressure setpoint 370 via an optional transient speed error adjuster module 400. If an engine is under high load, opening the throttle 180 alone may be insufficient to correct the speed immediately. Adjuster module 400 has an input from the engine speed comparator 310 and varies the first differential pressure or fuel injection pressure setpoint 370 via comparator module 402 if speed errors above a set minimum are detected. This can be used, for example, to provide more fuel to the mixture if a lag in engine speed is detected (i.e. fuel enrichment), by increasing the first differential pressure setpoint 370. Operation of the system in FIG. 28 is otherwise the same as described above in connection with FIG. 27, and like reference numbers are used for like parts as appropriate.

Figure 29:
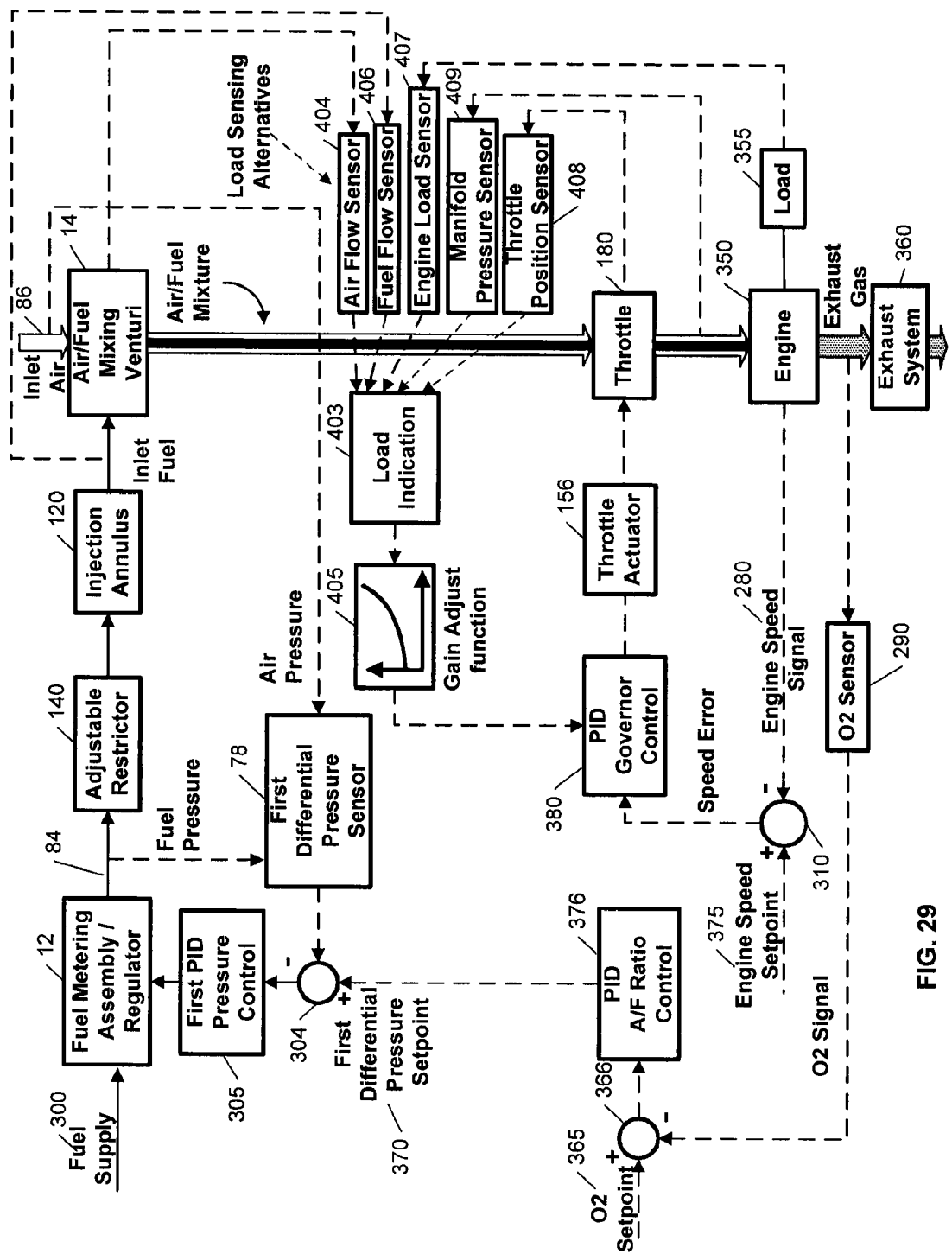
FIG. 29 is a block diagram illustrating another modified electronic control system with governor loop gain adjustment.

FIG. 29 illustrates another modification of the control system of FIG. 27. In the modified control system of FIG. 29, any one of a plurality of possible engine load sensors 404, 406, 407, 408, or 409 is used to provide an indication of the load 355 on the engine. The load indication output 403 from the selected sensor is used to adjust the governor according to a selected, programmed gain control function 405. Increasing the gain of the governor as the load increases can compensate for the decrease in engine gain as its load increases. The engine gain change is measured by how much fuel must be added to cause a one percent increase in speed. When the engine is running at near full load, it requires more fuel to cause an incremental change than it does when the engine is running unloaded, so that the engine speed is stable and responsive at any speed and load.

The load sensor which provides the load indication 403 may measure engine load directly or indirectly. The load sensor used in FIG. 29 to provide the load indication may be an air flow sensor 404 which uses a differential pressure measurement between the throat and air inlet of the air/fuel mixing venturi 14 to determine air flow, a fuel flow sensor 406 which uses a differential pressure measurement between the throat and fuel inlet of the air/fuel mixing venturi 14 to determine fuel flow, an engine load sensor 407 such as a watt meter which directly measures engine load 355, a manifold pressure sensor 409 which measures manifold pressure, or a throttle sensor which senses the throttle opening. Manifold pressure sensor 409 may be the pressure sensor 88 of FIG. 5 or another type of sensor which detects manifold pressure. Air flow into the venturi 14 starts to increase as the throttle starts to open, so the change in speed is rapid. However, as the engine reaches higher speeds, it is not as sensitive, and more movement is needed in order to adjust the speed. The gain function 405 is arranged to vary the rate of opening of the throttle to compensate for the high rate of engine speed adjustment at light loads and lower rate of engine speed adjustment at heavy loads, so that the adjustment rate is more constant. In other words, the throttle opens more slowly at the start, and opens faster at higher loads, as controlled by gain function 405. This is explained in more detail below for different engine loads:

1. Subsonic throttle flow condition at moderate to high engine loads, where $P_{manifold} \geq P_{inlet}/2$:

$$W_T = K * A_{throttle} * \sqrt{(P_{inlet} - P_{manifold}) * (P_{manifold}/T)}$$

2. Sonic throttle flow condition at zero to moderate engine loads, where $P_{manifold} \leq P_{inlet}/2$:

$$W_T = 2 * K * A_{throttle} * P_{inlet}/\sqrt{T}$$

Where:
$W_T$=engine inlet mixture flow (scfm)
K=Throttle constant
$A_{throttle}$=Throttle flow area (square inches)
$P_{inlet}$=Throttle inlet pressure (psia)
$P_{manifold}$=engine intake manifold pressure (psia)
T=Temperature of inlet air and intake mixture (deg R)

At low engine loads with sonic throttle flow (condition 2 above) the throttle gain (change in $W_T$/change in $A_{throttle}$) is much higher than at moderate to high loads with subsonic throttle flow. If the PID governor gains are set at constant values, the stability of the governor is much less at the low load (low air flow, high throttle gain) condition.

By sensing engine load using one of the engine load sensors of FIG. 29, and using the load indication to modify governor loop gain, the throttle opening rate can be adjusted up or down based on current load conditions, improving governor stability. The exact function used in the gain adjust module 405 may be modified based on the particular load signal used.

Figure 30:
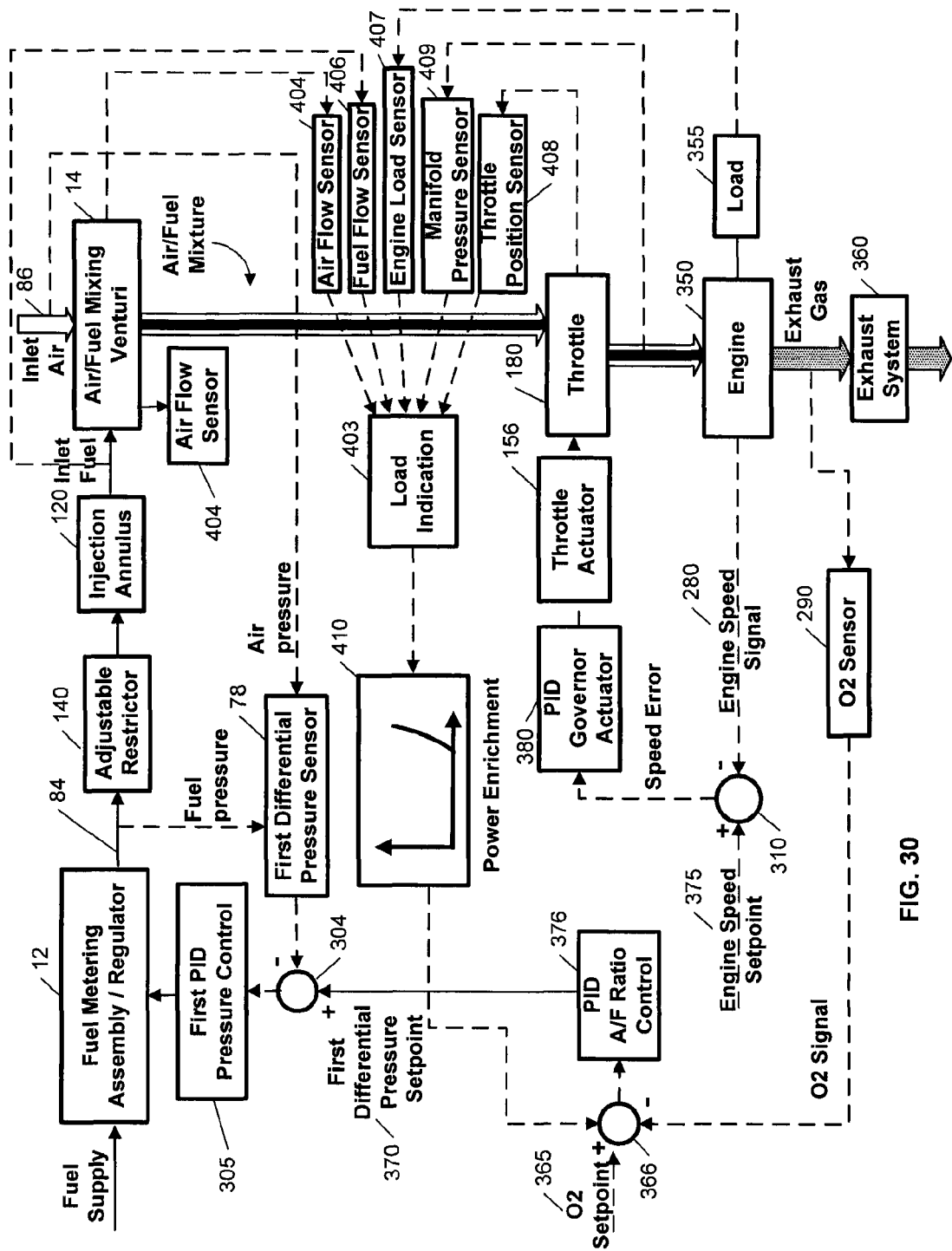
FIG. 30 is a block diagram illustrating a modified electronic control system which provides power enrichment at high load levels.

FIG. 30 illustrates another embodiment of the air/fuel ratio control system. In this embodiment, an additional adjustment function is provided in the oxygen sensor control loop. As in FIG. 29, a selected load sensor 404, 406, 407, 408, or 409 is used to provide an indication of engine load 403. However, in this embodiment, the load indication signal 403 is connected to a power enrichment module 410 which is programmed with a power enrichment function which is used to counteract the tendency of the engine speed to drop above certain engine loads. The power enrichment module operates to add more fuel to the mixture at engine loads above a predetermined value F, by varying the oxygen sensor setpoint 365 so as to increase the first differential pressure or pressure setpoint 370. The value F varies from engine to engine and may be set by a technician based on high load characteristics of the engine on which the control system is used. As in the embodiment of FIG. 29, the power enrichment module may use input from any of the alternative load sensors illustrated in FIG. 30, such as air flow in the venturi throat (sensor 404), fuel flow in the venturi throat (sensor 406), engine load (sensor 407), manifold pressure (sensor 409), or throttle opening (sensor 408). Load indication module 403 determines the engine load based on the output of the specific sensor used as the load indicator, and provides a load output signal to the power enrichment module. These alternatives may be used to increase the amount of fuel supplied and richen the mixture supplied to the engine at higher than rated load conditions. The predetermined load or throttle opening above which power enrichment is applied depends on the rating of the particular engine. This effectively overrides the air/fuel ratio controller 376 to allow the engine to run rich with excess fuel. The system of FIG. 30 is otherwise identical to that of FIG. 27.

One way to explain the benefit of using power enrichment as in FIG. 30 is to describe the way it works in an application. Assume this control is installed on a vehicle and the vehicle is running on level ground with a very lean mixture. It is necessary to accelerate the vehicle. The driver presses on the accelerator and the engine does not respond well because the mixture is too lean. The fuel control opens the throttle plate to the maximum position. Without making the mixture richer, the engine does not provide the power needed to carry the load. The power enrichment module provides a richer mixture under high load conditions to make the engine more responsive under such conditions.

FIG. 31 illustrates a modification of the system of FIG. 20 to include a second PID pressure controller 550 which controls operation of the rotary restrictor actuator 502 of FIG. 26 to vary the size of adjustable restriction 140 so that the fuel and air inlet pressures are maintained at a second differential pressure setpoint 550. The second differential pressure setpoint is set to zero in most cases, but may be set at a different pressure for some engines. Varying the opening size of adjustable restriction 140 allows the fuel inlet size to be varied until the detected differential pressure matches the second differential pressure setpoint 550. As illustrated in FIG. 31, the output from the differential pressure sensor 78 is also connected to a comparator 552 which compares the detected differential pressure to the second differential pressure setpoint. Second PID pressure control module 550 controls restrictor actuator 502 to vary the opening size of restriction 140 up or down based on the detected pressure differential, at a much slower rate than the fuel metering assembly adjustment based on the oxygen sensor control loop. If the differential pressure (fuel inlet pressure minus air inlet pressure) between the air and fuel inlets is greater than the second differential pressure setpoint 552, the restriction 140 is increased in size and if the differential pressure is less than the second differential pressure setpoint, the restriction 140 is decreased in size. Since the air and fuel properties typically change gradually throughout the day, this control loop can be made relatively slow in relation to the oxygen sensor and pressures sensor control loops. For example, the second PID pressure controller 550 may be programmed to activate the restrictor actuator 502 only if the pressure differential varies from the second differential pressure setpoint for more than a predetermined time period, for example thirty seconds or more. This eliminates undesirable interactions between the two control loops. This also allows a small low power actuator to be used for adjusting the restriction. A geared stepper motor is one example of a suitable actuator. The embodiment of FIG. 31 is otherwise identical to that of FIG. 20 and like reference numbers are used for like parts as appropriate.

In an alternative embodiment, the governor control loop of FIG. 27 may also be used in the system of FIG. 31.

In one embodiment, the second PID pressure controller 550 may also be connected to a pressure sensor which senses the position of restrictor actuator 502 to provide feedback. The controller 550 controls the actuator 502 to drive it to a predetermined position for specific engine conditions, such as starting conditions.

The automatic adjustment of the adjustable restriction 140 at the fuel inlet as illustrated in FIG. 31 allows the venturi to operate with optimum or close to optimum conditions where the fuel and air inlet pressures match, independent of fuel properties, air temperature, and engine load. As long as the adjustable restriction 140 is set to where the differential pressure between the fuel and air inlet of the venturi is maintained at zero psid, the air/fuel ratio remains nearly constant throughout all engine loads, and the controller only needs to make minor adjustments to the fuel inlet pressure in order to achieve the required exhaust emissions.

The main advantage of using a venturi to mix the air and fuel, as in the above embodiments, is its ability to maintain a near constant air/fuel ratio over a wide range of engine loads, without having to readjust the fuel inlet pressure. In order to maintain a nearly constant mixture with a single pressure setpoint, the fuel inlet pressure is matched closely to the air inlet pressure. This is achieved by using a differential pressure sensor 78 between the fuel and air inlets and maintaining a setpoint at or close to zero psi differential (psid).

Once set with substantially matching fuel and air inlet pressures as described above, the venturi maintains a near constant air/fuel ratio independent of the engine load. Only minor adjustments to the fuel inlet pressure are required during engine load transients in order to achieve the desired exhaust emissions. In contrast, a system operating without matching fuel and air inlet pressures needs to make significant adjustments to the fuel inlet pressure after each load transient in order to maintain the same air/fuel ratio.

Figure 32:
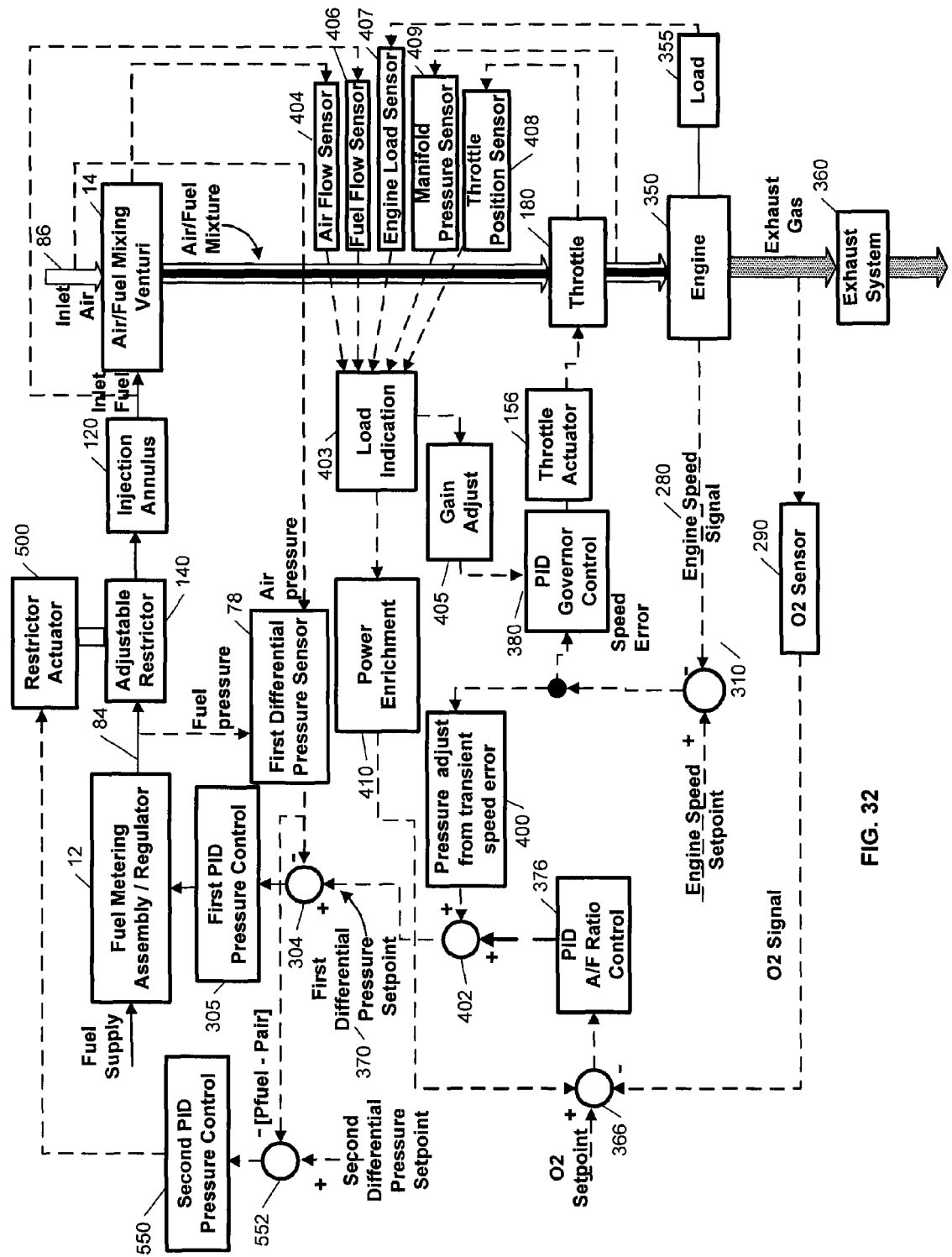
FIG. 32 is a block diagram illustrating a control system which combines all the control options of FIGS. 27 to 31.

FIG. 32 illustrates another embodiment of an air/fuel ratio control system for the carburetor assembly. In this embodiment, some of the options of FIGS. 27 to 31 are combined into a single control system. The output of load indication module 403 of FIGS. 29 and 30 is connected both to the power enrichment module 410 as in FIG. 30 for control of the pressure control loop by adjusting the exhaust oxygen setpoint, and to the gain adjust module 405 as in FIG. 29 to vary the output of governor control module 380, using any of the optional direct or indirect engine load sensors 404, 406, 407, 408, or 409. Additionally, the transient setpoint adjustment module 400 is also connected between the governor and fuel pressure control loops, as in FIG. 28, so as to vary the first differential pressure setpoint to compensate for transient speed errors. Additionally, the zero pressure regulator controller 550 controls the restrictor actuator 502 to vary the size of restriction 140 at a rate slower than the other control loops, so as to keep the first differential set point at or close to zero psid.

The unitary fuel control system of the above embodiments is readily adjustable between rich-burn or lean-burn modes by varying the exhaust oxygen setpoint. At the same time, the system can maintain a constant or close-to-constant air/fuel mixture with fast recovery from load or speed transients. Performance of the engine is enhanced by the interaction between the various control loops and associated sensors. At the same time, the overall operation is enhanced and simplified by providing all the components of the fuel control system, both mechanical and electronic, in a single unit or assembly readily mountable on a gas engine intake manifold.

In the above embodiments, an oxygen sensor in the exhaust is used to adjust the air fuel ratio, but alternative sensors could be used for reducing exhaust emissions. Alternate sensors could be used to measure exhaust components such as CO, $CO_2$, $NO_X$, and HC (unburned hydrocarbons). These sensors could potentially be used independently, or in combination with each other, to control the air fuel ratio to an engine. Sophisticated analyzers are currently capable of measuring most of the above exhaust components, but they are too large and expensive to be a practical alternative to the common automotive oxygen sensors used today.

Figure 33:
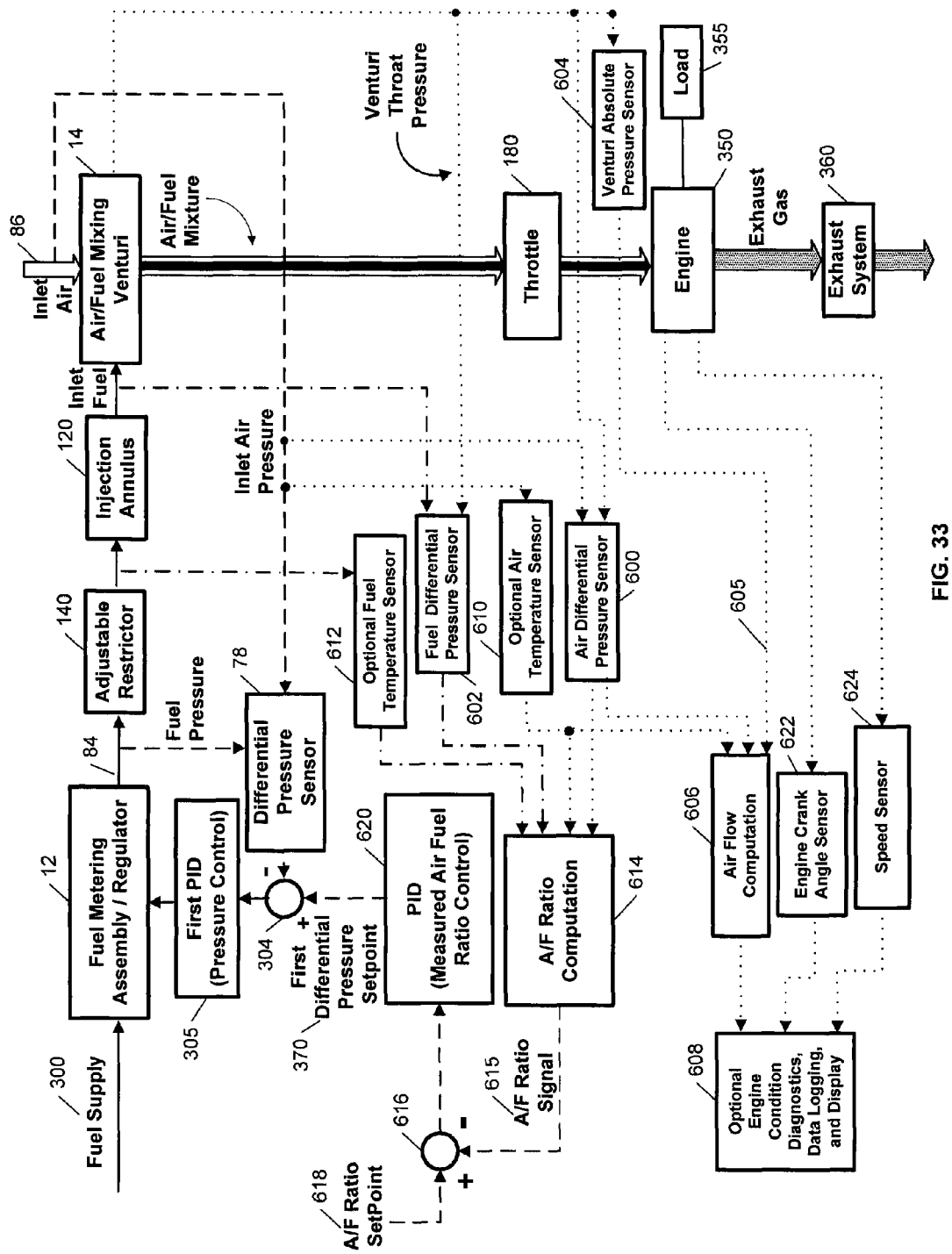
FIG. 33 is a block diagram illustrating another embodiment of an electronic control system for controlling air/fuel ratio in a carburetor.

Some engine applications use nonstandard gaseous fuels containing contaminants that can cause premature failure of the oxygen sensor. In such a situation, the system may be run without an oxygen sensor and may use an alternate engine parameter to adjust the air fuel ratio. FIG. 33 illustrates another embodiment of an air/fuel ratio control system which does not use an oxygen sensor, but instead calculates the air/fuel ratio by measuring the actual air and fuel flow entering the engine. This system is suitable for lean burn applications because the exhaust emissions are much less sensitive to changes in the air fuel ratio than are stoichiometric applications using a catalyst. The calculated air fuel ratio replaces the oxygen sensor signal, and the oxygen sensor setpoint is replaced by an air fuel ratio setpoint, as illustrated in FIG. 33.

In the embodiment of FIG. 33, some parts of the carburetor and control system are identical to parts in previous embodiments, and like reference numbers are used as appropriate. In this embodiment, additional sensors are provided for sensing pressures at different locations in the air/fuel mixing venturi, specifically an air differential pressure sensor 600 which detects the difference in pressure at the venturi throat and the air inlet to the venturi and a fuel differential pressure sensor 602 which detects the difference in pressure between the venturi throat and the fuel inlet to the venturi. A venturi absolute pressure sensor 604 may also be provided to provide an output signal 605 for use in an air flow computation module 606 used in conjunction with an optional engine condition diagnostics, data logging, and display module 608, as explained in more detail below. Optional air and fuel temperature sensors 610, 612 may also be located in the air and fuel inlet passageways, respectively, of the air/fuel mixing venturi.

The outputs of the air differential pressure sensor 600 and the fuel differential pressure sensor 602 (and the air and fuel temperature sensors 610, 612 if used) are connected to an air/fuel (A/F) ratio computation module 614 which uses these inputs as described below to compute a measured air/fuel ratio signal 615 which corresponds to the ratio between the air flow and fuel flow at the throat of the venturi. This signal is connected to one input of an air/fuel ratio comparator 616. A predetermined A/F ratio setpoint 618 is connected to the second input of comparator 616. The difference between setpoint 618 and the measured air/fuel ratio 615 is provided as the input to measured air/fuel ratio control module or PID controller 620, and the differential pressure setpoint 370 is varied based on the output of control module 620. Setpoint 370 is then used in the same way as described above in connection with FIG. 27 to control fuel supply to the venturi. Any of the other control options illustrated and described above in connection with FIGS. 28 to 32 may also be used in the control system of FIG. 33, including the governor control loop and adjustments based on direct or indirect engine load indication signals.

Calculations of the actual air/fuel flow ratio can assume constant air and fuel temperatures or the actual temperatures can be measured if a more accurate result is required. Calculating the air fuel ratio requires two additional differential pressure sensors 600 and 602 connected between the venturi throat and the air inlet, and between the venturi throat and fuel inlet, respectively, and optionally, two additional temperature sensors. Calculating the actual air or fuel flow requires an additional absolute pressure sensor 604 at the throat of the venturi. The following equations may be used to calculate air and fuel flow and air/fuel ratio in the computation module 614 and 606.

Air Flow Equation 1:

$$W_a = K_{air} * A_{throat} * [P_{throat} * (P_{air} - P_{throat}) / T_{air}]^{1/2}$$

Where:
$W_a$ = air flow into the venturi (scfm)
$K_{air}$ = air constant
$A_{throat}$ = venturi throat area (square inches)
$P_{air}$ = venturi air inlet pressure (psia)
$P_{throat}$ = venturi throat pressure (psia)
$T_{air}$ = Temperature of the air flow into the venturi (deg R)

Fuel Flow Equation 2:

$$W_f = K_{fuel} * A_{fuel} * [P_{throat} * (P_{fuel} - P_{throat}) / T_{fuel}]^{1/2}$$

Where:
$W_f$ = fuel flow into the venturi (scfm)
$K_{fuel}$ = fuel constant
$A_{fuel}$ = venturi fuel inlet area (square inches)
$P_{fuel}$ = venturi fuel inlet pressure (psia)
$P_{throat}$ = venturi throat pressure (psia)
$T_{fuel}$ = Temperature of the fuel flow into the venturi (deg R)

Air Fuel Ratio Calculation 3: (divide air flow by fuel flow)

$$A/F = K_{1\ total} * (T_{fuel} / T_{air})^{1/2} * [(P_{air\ inlet} - P_{throat}) / (P_{fuel\ inlet} - P_{throat})]^{1/2}$$

Where: $K_{1\ total} = (K_{air} * A_{throat}) / (K_{fuel} * A_{fuel})$

Air Fuel Ratio Calculation With Constant Temperatures 4:

$$A/F = K_{2\ total} * [(P_{air\ inlet}/T_{throat})/(P_{fuel\ inlet} - P_{throat})]^{\wedge 1/2}$$

Where: $K_{2\ total} = (K_{air} * A_{throat} * T_{fuel}^{\wedge 1/2})$
$(K_{fuel} * A_{fuel} * T_{air}^{\wedge 1/2})$ As noted above, the system of FIG. 33 also includes a diagnostic, data logging, and display module 608 which can be used by operators to check engine status and determine if maintenance is required. An air flow computation module 606 which computes air flow at the venturi based on the outputs of absolute pressure sensor 604 and differential pressure sensor 600 (and temperature sensor 610 if used) is connected to the input of module 608. The air flow is computed using equation 1 above (temperature can be measured or assumed to be constant). An engine crank angle sensor 622 and a speed sensor 624 may also be connected to the diagnostic module 608. Knowing the actual air flow into the engine is useful for various engine diagnostics. The volumetric efficiency of the engine can be calculated using the intake air flow, crank RPM, cylinder bore diameter, and piston stroke of the engine. The volumetric efficiency is a good indication of the physical condition of the engine and can help identify problems such as damaged intake and exhaust valves.

The addition of a crank angle sensor further improves diagnostic capability by providing the position of each piston during its stroke. For example, it can be used in conjunction with a manifold pressure sensor to show and compare where the peak vacuum is occurring for each cylinder. It can also provide the spark timing when used in conjunction with a sensor on the ignition coil.

Those of skill will appreciate that the various illustrative logical blocks, units, modules, circuits, and algorithm steps described in connection with the embodiments disclosed herein can often be implemented as electronic hardware, computer software, or combinations of both. To clearly illustrate this interchangeability of hardware and software, various illustrative components, units, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks, components, units, and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A fuel control system for a gas engine, comprising:
an air/fuel mixing venturi which supplies an air/fuel mixture to a gas fuel engine, the venturi having a reduced area throat, an air supply inlet to the venturi, and a plurality of gas fuel injection ports at the venturi throat, whereby gas flows through the injection ports to the venturi throat as a function of flow of air through the air supply inlet;
a fuel metering assembly which controls the supply of gaseous fuel to the gas fuel injection ports of the air/fuel mixing venturi;
an air/fuel ratio control module which establishes a first differential pressure setpoint between gaseous fuel and air inputs to the air/fuel mixing venturi, the first differential pressure setpoint being adjusted as a function of an engine operating parameter;
a first differential pressure sensor which detects a differential pressure between the actual pressure of fuel supplied to a fuel inlet of an air/fuel mixing venturi and the air inlet pressure to an air inlet of the venturi; and
a first pressure control module associated with the air/fuel ratio control module and first differential pressure sensor which controls the fuel metering assembly to vary the injection pressure of gaseous fuel supplied to the air/fuel mixing venturi based on a detected difference between the first differential pressure setpoint and the detected differential pressure.

2. The system of claim 1, further comprising a speed comparator which compares an engine speed signal with an engine speed setpoint and produces a speed error signal output in response to a detected transient speed error, and a governor control module which controls an engine throttle actuator to adjust a throttle valve opening in response to a detected speed error.

3. The system of claim 2, further comprising a transient speed control module associated with the speed comparator which varies the first differential pressure setpoint from the air/fuel control module based on a detected transient speed error, whereby the fuel supply to the mixing venturi is adjusted in response to a detected transient speed error.

4. The system of claim 1, further comprising a load sensor which senses variations in an engine operating parameter.

5. The system of claim 4, further comprising an engine throttle actuator which controls an engine throttle valve opening, a governor control module which controls the engine throttle actuator as a function of governor loop gain, and a gain control module associated with the load sensor and governor control module which modifies governor loop gain as a function of the detected engine operating parameter.

6. The system of claim 4, further comprising a power enrichment module associated with the load sensor which increases fuel supply to the venturi in response to a detected engine operating parameter above a predetermined value.

7. The system of claim 6, wherein the power enrichment module adjusts the first differential pressure setpoint output of the air/fuel ratio control module when the detected engine operating parameter is above the predetermined value.

8. The system of claim 4, wherein the load sensor comprises an air flow sensor and the engine operating parameter is air flow in the air/fuel mixing venturi.

9. The system of claim 4, wherein the load sensor comprises a fuel flow sensor and the engine operating parameter is fuel flow to the air/fuel mixing venturi.

10. The system of claim 4, wherein the load sensor comprises an engine load sensor and the engine operating parameter is engine load.

11. The system of claim 4, wherein the load sensor comprises a throttle angle sensor and the engine operating parameter is a throttle valve opening.

12. The system of claim 4, wherein the load sensor comprises an engine manifold pressure sensor and the engine operating parameter is engine manifold pressure.

13. The system of claim 1, further comprising an actuator which controls the size of a variable restriction at the fuel inlet to the venturi, and a second differential pressure control module which automatically controls the actuator to vary the size of the variable restriction in response to a detected variation between the detected differential pressure and a second differential pressure setpoint.

14. The system of claim 13, wherein the second differential pressure setpoint is zero.

15. The system of claim 13, wherein the second differential pressure control module operates at slower speed than the first differential pressure control module.

16. The system of claim 1, further comprising at least one sensor which detects an engine operating parameter level and a comparator module which compares the detected engine operating parameter to a predetermined engine operating parameter setpoint, the first differential pressure setpoint being varied as a function of variations between the detected engine operating parameter level and the engine operating parameter setpoint.

17. The system of claim 16, wherein the sensor comprises an exhaust gas sensor for detecting the level of a predetermined exhaust gas and the operating parameter setpoint comprises an exhaust gas level setpoint, the first differential pressure setpoint being adjusted in response to variation between the detected exhaust gas level and the exhaust gas level setpoint.

18. The system of claim 17, wherein the exhaust gas sensor is an oxygen sensor.

19. The system of claim 17, wherein the exhaust gas sensor detects oxides of nitrogen (NOx) in the exhaust from the engine.

20. The system of claim 16, comprising an air flow differential pressure sensor which measures a differential pressure between the throat and air inlet of the venturi, a fuel flow differential pressure sensor which measures a differential pressure between the throat and fuel inlet of the venturi, and an air fuel ratio computation module which calculates a detected air/fuel ratio based on at least the outputs of the air flow and fuel flow differential pressure sensors, the engine operating parameter setpoint comprising an air/fuel ratio setpoint, and the comparator comparing the detected air/fuel ratio with the air/fuel ratio setpoint, the first differential pressure setpoint being adjusted in response to variation between the detected air/fuel ratio and the air/fuel ratio setpoint.

21. The system of claim 20, further comprising a first temperature sensor which detects the temperature of the air at the inlet to the air/fuel mixing venturi and a second temperature sensor which detects the temperature of the fuel supplied to the air/fuel mixing venturi, the temperature sensors having outputs connected to the air/fuel ratio computation module and the air/fuel ratio computation module including air and fuel temperature in the computation of the air/fuel ratio.

22. The system of claim 1, further comprising a plurality of engine condition sensors and an engine condition diagnostic module associated with the engine condition sensors which produces at least one output diagnostic signal.

23. The system of claim 22, wherein one of the engine condition sensors comprises an air flow sensor.

24. The system of claim 23, wherein the engine condition sensors further comprise an engine crank angle sensor.

25. The system of claim 23, wherein the engine condition sensors further comprise an engine speed sensor.

26. The system of claim 23, wherein the air flow sensor comprises a first sensor device which senses absolute pressure at the venturi throat, a second sensor device which detects a differential pressure between the air inlet and the throat of the venturi, a third sensor device which detects temperature at the air inlet to the venturi, and a computation module which calculates air flow through the venturi based on the outputs of the first, second, and third sensor devices.

27. The system of claim 22, wherein said at one output diagnostic signal comprises an engine volumetric efficiency signal.

28. A method of controlling the supply of gaseous fuel to a gas engine, comprising:
  determining a desired first differential pressure setpoint between gaseous fuel and air pressures at air and fuel inlets, respectively, of an air/fuel mixing venturi which supplies an air/fuel mixture to an engine, the first differential pressure setpoint being varied based on a detected engine operating parameter;
  detecting actual fuel and air pressures at the fuel and air inlets, respectively, of the air/fuel mixing venturi;
  determining a differential pressure between the detected fuel and air pressures;
  comparing the first differential pressure setpoint to the detected differential pressure; and
  adjusting the fuel supply to the fuel inlet of the air/fuel mixing venturi in response to a detected difference between the first differential pressure setpoint and the detected differential pressure until the detected differential pressure is at least substantially equal to the first differential pressure setpoint.

29. The method of claim 28, wherein the engine operating parameter is a level of a predetermined exhaust gas in the engine exhaust.

30. The method of claim 29, wherein the exhaust gas comprises oxygen.

31. The method of claim 30, further comprising detecting an engine operating parameter and increasing the exhaust oxygen setpoint when the detected engine parameter is above a predetermined value.

32. The method of claim 31, wherein the engine operating parameter is selected from the group consisting of air flow through the venturi, fuel flow through the venturi, engine load, engine manifold pressure, and throttle angle.

33. The method of claim 29, wherein the exhaust gas comprises oxides of nitrogen (NOx).

34. The method of claim 28, further comprising comparing a detected engine speed signal to an engine speed setpoint and controlling a throttle actuator to vary a throttle opening in response to a speed error signal corresponding to a detected difference between the detected engine speed signal and the engine speed setpoint.

35. The method of claim 34, further comprising varying the first differential pressure setpoint in response to a speed error signal, whereby the gas supply to the air/fuel mixing venturi is adjusted in response to detected transient speed errors.

36. The method of claim 35, further comprising detecting an engine operating parameter and controlling the throttle actuator to adjust the rate of throttle opening as a function of the detected engine parameter level.

37. The method of claim 36, wherein the engine operating parameter is selected from the group consisting of air flow through the venturi, fuel flow through the venturi, engine load, engine manifold pressure, and throttle angle.

38. The method of claim 28, wherein the engine operating parameter is based on the actual ratio between air flow and fuel flow at the throat of the venturi.

39. The method of claim 28, further comprising the steps of detecting an air differential pressure between detected pressures at the air inlet and throat of the venturi, detecting a fuel differential pressure between detected pressures at the fuel inlet of the venturi and throat of the venturi, calculating the air/fuel ratio between air flow and fuel flow at the throat of the venturi based on the detected air and fuel differential pressures, comparing the calculated actual air/fuel ratio to an air/fuel ratio setpoint, and adjusting the first differential pressure setpoint based on differences between the calculated, actual air/fuel ratio and the air/fuel ratio setpoint.

40. The method of claim 39, further comprising the steps of detecting the temperature of air supplied to the venturi and detecting the temperature of fuel supplied to the venturi, and using the air and fuel temperatures in the calculation of the air/fuel ratio.

41. The method of claim 28, further comprising comparing the detected differential pressure to a second differential pressure setpoint and adjusting the size of an adjustable restrictor at the venturi fuel inlet when the detected differential pressure varies from the second differential pressure setpoint for more than a predetermined time period.

42. A gaseous carburetor assembly for a gas engine, comprising:
a single fuel control unit which is secured to an engine intake manifold of a gas engine, the control unit comprising at least a venturi mixer assembly, a fuel metering assembly, and an electronic control assembly which are secured together to form a single body;
the venturi mixer assembly having a venturi body with a passage for air flow through the venturi body, an air inlet at one end of the passage, a fuel-air mixture outlet at a second end of the passage, a venturi throat of reduced cross-sectional area, and a fuel inlet to the venturi throat;
the fuel metering assembly having an inlet connected to a gaseous fuel supply, a fuel supply passage which communicates with the venturi fuel inlet, and an adjustable metering valve which controls the area of the fuel supply passage;
a differential pressure sensor which senses a differential pressure between the fuel supply to the venturi fuel inlet and the air supply at the venturi air inlet; and
the electronic control assembly being connected directly to the fuel metering assembly and including a fuel pressure controller which controls the fuel supply to the venturi fuel inlet.

43. The assembly of claim 42, wherein the control unit further comprises a throttle assembly attached to the second end of the passage, the throttle assembly having an outlet for connection to an engine intake manifold.

44. The assembly of claim 43, further comprising a throttle valve in the throttle assembly and a throttle actuator which controls the throttle valve opening and which is mounted on the fuel control unit.

45. The assembly of claim 44, wherein the electronic control assembly further comprises a governor control module which monitors engine speed and controls the throttle actuator to vary the throttle opening in response to detected transient speed errors.

46. The assembly of claim 45, further comprising a load sensor which detects a selected engine operating parameter, the load sensor having an output associated with the governor control module, whereby the throttle opening rate is varied based on variations in the detected engine operating parameter from a predetermined value.

47. The assembly of claim 44, further comprising a restriction of adjustable size between the fuel supply passage and the venturi fuel inlet, and an actuator for adjustment of the size of the restriction.

48. The assembly of claim 47, wherein the actuator is manually operated.

49. The assembly of claim 47, wherein the control assembly further comprises a differential pressure sensor which detects differences between the air and fuel inlet pressures to the venturi air and fuel inlets, and a restriction size control module which automatically controls the actuator to adjust the size of the restriction when the detected differential pressure differs from a differential pressure setpoint.

50. The assembly of claim 42, further comprising a sensor which detects a selected engine operating parameter, the sensor having an output associated with the electronic control assembly to adjust fuel supply to the venturi inlet based on variations in the detected engine operating parameter from a predetermined value.

51. A gaseous carburetor apparatus, comprising:
a venturi mixer assembly having a venturi body with a passage for air flow through the venturi having an air inlet at one end, an air/fuel outlet at an opposite end for connection to an engine intake module, a venturi throat of reduced cross-sectional area between the inlet and outlet, and at least one fuel inlet to the venturi throat;
a fuel metering assembly having an inlet connected to a gaseous fuel supply, a fuel supply passage which communicates with the venturi fuel inlet, and an adjustable metering valve which controls the area of the fuel supply passage to vary the amount of fuel supplied to the venturi throat;

an electronic control unit which controls the fuel metering assembly to adjust the fuel supply to the venturi fuel inlet; and the venturi mixer assembly further comprising a restriction of adjustable size between the fuel supply passage and the venturi fuel inlet, and an actuator for adjusting the size of the restriction to control the effective size of the venturi fuel inlet.

52. The apparatus of claim 51, further comprising an outer housing surrounding the venturi body, the venturi body having a plurality of fuel inlets which communicate with the venturi throat and an injection annulus in the venturi body which surrounds the fuel inlets, the outer housing defining an outer annulus which surrounds the injection annulus, the fuel metering passage communicating with the outer annulus, and the adjustable restriction connecting the outer annulus with the fuel injection annulus to control the effective size of the venturi fuel inlet.

53. The apparatus of claim 51, wherein the actuator is manually operated.

54. The assembly of claim 51, wherein the control unit includes a differential pressure sensor which detects differences between the air and fuel inlet pressures to the venturi air and fuel inlets, and a restriction size control module which automatically controls the actuator to adjust the size of the restriction when the detected differential pressure differs from a differential pressure setpoint.

55. The assembly of claim 54, wherein the differential pressure setpoint is zero.

56. A fuel control system for a gas engine, comprising:

an air/fuel mixing device which supplies an air/fuel mixture to a gas fuel engine, the mixing device having an air supply inlet, a gaseous fuel inlet, and an air/fuel mixture outlet;

a fuel metering assembly which controls the supply of gaseous fuel to the gaseous fuel inlet;

an air/fuel ratio control module which establishes a first gaseous fuel pressure set point, the first gaseous fuel pressure set point being adjusted as a function of an engine operating parameter;

a first pressure sensor which detects the actual pressure of gaseous fuel supplied to the fuel inlet of an air/fuel mixing device; and a first pressure control module associated with the air/fuel ratio control module and first pressure sensor which controls the fuel metering assembly to vary the injection pressure of gaseous fuel supplied to the air/fuel mixing device based on a detected difference between the first gaseous fuel pressure set point and the detected fuel pressure.

* * * * *